United States Patent
Ko et al.

(10) Patent No.: US 9,232,169 B2
(45) Date of Patent: Jan. 5, 2016

(54) DISPLAY APPARATUS AND DISPLAY METHOD

(71) Applicant: SAMSUNG ELECTRONICS CO., LTD., Suwon-si (KR)

(72) Inventors: Chang-seog Ko, Hwaseong-si (KR); Eun-jung Kwon, Suwon-si (KR); Jun-mo Ahn, Seoul (KR); Yong-hwan Kwon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/322,607

(22) Filed: Jul. 2, 2014

(65) Prior Publication Data

US 2015/0009405 A1    Jan. 8, 2015

(30) Foreign Application Priority Data

Jul. 2, 2013    (KR) .................. 10-2013-0077276

(51) Int. Cl.
*H04N 21/235*    (2011.01)
*H04N 5/445*    (2011.01)
(Continued)

(52) U.S. Cl.
CPC ....... *H04N 5/44582* (2013.01); *H04N 21/4221* (2013.01); *H04N 21/42204* (2013.01); *H04N 21/42215* (2013.01); *H04N 21/4316* (2013.01); *H04N 21/4622* (2013.01); *H04N 21/482* (2013.01); *H04N 21/8133* (2013.01); *H04N 21/4347* (2013.01); *H04N 2005/44556* (2013.01)

(58) Field of Classification Search
CPC .................................. H04N 21/235

USPC ................ 348/564, 563, 565, 566, 569, 725; 345/169, 168
See application file for complete search history.

(56) References Cited

U.S. PATENT DOCUMENTS 6,094,237 A *  7/2000  Hashimoto .............. 348/731
6,337,715 B1 *  1/2002  Inagaki et al. .............. 348/553
(Continued)

FOREIGN PATENT DOCUMENTS

EP        1988709 A1    11/2008
JP      2007-96569 A     4/2007
(Continued)

OTHER PUBLICATIONS

International Search Report, dated Mar. 31, 2014, issued by the International Searching Authority in counterpart International Application No. PCT/KR2013/011211.
(Continued)

*Primary Examiner* — Paulos M Natnael
(74) *Attorney, Agent, or Firm* — Sughrue Mion, PLLC

(57) ABSTRACT

A display apparatus and a display method are provided. The display apparatus includes: a receiver configured to receive a broadcasting signal; a display unit configured to display a content included in the received broadcasting signal on a full screen; a control signal receiver configured to receive a control signal from a remote controller; and a controller configured to, if it is determined that a screen dividing signal has been input through the remote controller, divide the full screen into a plurality of divided screens to add a new screen. The controller sets the new screen of the plurality of divided screens to be controlled according to the control signal and displays the new screen so as to distinguish the new screen to be controlled from the other divided screens.

24 Claims, 27 Drawing Sheets

(51) Int. Cl.
*H04N 21/422* (2011.01)
*H04N 21/431* (2011.01)
*H04N 21/482* (2011.01)
*H04N 21/81* (2011.01)
*H04N 21/462* (2011.01)
*H04N 21/434* (2011.01)

(56) References Cited

U.S. PATENT DOCUMENTS

| | | | |
|---|---|---|---|
| 7,061,544 B1* | 6/2006 | Nonomura et al. | 348/568 |
| 8,054,319 B2* | 11/2011 | Lee et al. | 345/620 |
| 2003/0113096 A1* | 6/2003 | Taira et al. | 386/46 |
| 2005/0156896 A1* | 7/2005 | Yu | 345/169 |
| 2006/0244864 A1* | 11/2006 | Hayashi | 348/588 |
| 2010/0083304 A1 | 4/2010 | Pan | |
| 2010/0118195 A1* | 5/2010 | Eom et al. | 348/564 |
| 2011/0058102 A1 | 3/2011 | Nishimura | |
| 2012/0320271 A1 | 12/2012 | Chen et al. | |
| 2013/0300934 A1* | 11/2013 | Cho et al. | 348/500 |

FOREIGN PATENT DOCUMENTS

| | | |
|---|---|---|
| JP | 2008-42283 A | 2/2008 |
| KR | 10-2010-0107142 A | 10/2010 |
| WO | 03/021949 A1 | 3/2003 |

OTHER PUBLICATIONS

Written Opinion, dated Mar. 31, 2014, issued by the International Searching Authority in counterpart International Application No. PCT/KR2013/011211.

Communication dated Nov. 11, 2014, issued by the European Patent Office in counterpart European Application No. 14154489.0.

* cited by examiner (Long-Press)   (Long-Press)

(Short-Press)  (Short-Press)

DISPLAY APPARATUS AND DISPLAY METHOD

CROSS-REFERENCE TO RELATED APPLICATION

This application claims priority from Korean Patent Application No. 10-2013-0077276, filed on Jul. 2, 2013, in the Korean Intellectual Property Office, the disclosure of which is incorporated herein by reference in its entirety.

BACKGROUND

1. Field

Apparatuses and methods consistent with exemplary embodiments generally relate to providing a display apparatus and a display method, and more particularly, to providing a display apparatus that divides a screen according to a signal input through a remote controller to provide various screens, and a display method.

2. Description of the Related Art

A display apparatus refers to an apparatus that displays a transmitted image through a display unit such as a cathode-ray tube (CRT), a plasma display panel (PDP), a liquid crystal display (LCD), an organic light-emitting diode (OLED), or the like. The display apparatus has been rapidly developed from an analog TV into a digital TV (DTV), an Internet Protocol TV (IPTV), or the like.

The DTV has provided various types of functions such as a function of receiving a digital broadcasting, a function of receiving an electronic program guide (EPG), a bidirectional communication function, a function of accessing the Internet, etc. The DTV has taken charge of a function of a server in a home network environment or a ubiquitous environment. The IPTV is distinguished from an existing TV in that desired broadcasting is selected and watched, or is editable. In other words, the IPTV has various advantages similar to those of the existing TV. In other words, a viewer may view a program, which is broadcast in a broadcasting station, through the Internet and may be provided with various types of contents, which are provided on the Internet, without additionally controlling a personal computer (PC). The IPTV enables bidirectional communications due to these advantages and thus is expected to take center stage.

As technologies related to a display apparatus including the DTV and the IPTV are developed, a size of a screen of the display apparatus has been increased. Also, the types and the number of various types of contents that may be displayed through the display apparatus have been geometrically increased.

Therefore, there is a need to implement various types of screens compared to an existing display apparatus. Also, there is a need for methods of further conveniently controlling the various types of screens.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus that divides a screen into a plurality of screens to provide various types of screens according to a signal input through a remote controller, and a display method.

According to an aspect of the exemplary embodiments, there is provided a display apparatus including: a receiver configured to receive a broadcasting signal; a display unit configured to display a content included in the received broadcasting signal on a full screen; a control signal receiver configured to receive a control signal from a remote controller; and a controller configured to, if it is determined that a screen dividing signal has been input through the remote controller, divide the full screen into a plurality of divided screens to add a new screen. The controller may set the new screen of the plurality of divided screens to be controlled according to the control signal and display the new screen so as to be distinguishable from other divided screens. The new screen may be pre-set by a user.

If a direction signal is input from the remote controller, the controller may change the new screen to be controlled among the plurality of divided screens according to the direction signal, and if it is determined that a full screen signal has been input from the remote controller, the controller may control the display unit to display the new screen to be controlled on the full screen.

If a button of the remote controller is pressed long for a threshold duration, the controller may determine that the screen dividing signal has been input, and if the button of the remote controller is pressed short for less than the threshold duration, the controller may determine that the full screen signal has been input.

If one of a plurality of buttons of the remote controller is pressed long for a threshold duration, the controller may determine that the screen dividing signal has been input, divide the full screen into the plurality of divided screens to add the new screen, and display a content, which is provided from a source corresponding to the long-pressed button, on the new screen.

If the long-pressed button of the plurality of buttons is pressed short, the controller may display a content, which is provided from a source corresponding to the button, on the full screen.

The controller may display at least one selectable application information on the new screen, and if one application information is selected from the at least one selectable application information, display an execution screen of an application corresponding to the selected one application information, on the new screen.

The controller may sequentially adjust a number of the plurality of divided screens according to a number of inputs of the screen dividing signal.

If the full screen is divided into the plurality of divided screens, the controller may reduce and display the full screen including the plurality of divided screens in a smaller size than a full display area of the display unit.

The controller may display a user interface (UI), which enables selection of a new content to be displayed on the new screen, on the new screen.

The controller may display contents that respectively correspond to the plurality of divided screens.

The controller may display an automatic content recognition (ACR) list within at least one of the plurality of divided screens, and if one ACR is selected from the ACR list, display the selected ACR on the corresponding divided screen.

According to another aspect of the exemplary embodiments, there is provided a display method of a display apparatus. The display method may include: receiving a broadcasting signal; displaying a content included in the received broadcasting signal on a full screen; if it is determined that a screen dividing signal has been input through a remote controller, dividing the full screen into a plurality of divided screens to add a new screen; setting the new screen of the plurality of divided screens to be controlled according to a control signal; and displaying the new screen to be controlled so as to be distinguishable from other divided screens.

The display method may further include: if a direction signal is input from the remote controller, changing the new screen to be controlled among the plurality of divided screens according to the direction signal; and if it is determined that a full screen signal has been input from the remote controller, displaying the new screen to be controlled on the full screen.

The display method may further include: if a button of the remote controller is pressed long for a threshold duration, determining that the screen dividing signal has been input; and if the button of the remote controller is pressed short for less than the threshold duration, determining that the full screen signal has been input.

The display method may further include: if one of a plurality of buttons of the remote controller is pressed long for a threshold duration, determining that the screen dividing signal has been input; dividing the full screen into the plurality of divided screens to add the new screen; and displaying a content, which is provided from a source matching with the long-pressed button, on the new screen.

The display method may further include: if the long-pressed button of the plurality of buttons is pressed short, displaying a content, which is provided from a source corresponding to the long-pressed button, on the full screen.

The display method may further include: displaying at least one selectable application information on the new screen; selecting one application information from the at least one selectable application information; and displaying an execution screen of an application corresponding to the selected one application information on the new screen.

The display method may further include: sequentially adjusting a number of the plurality of divided screens according to a number of inputs of the screen dividing signal.

The display method may further include: if the fill screen is divided into the plurality of divided screens, reducing and displaying the full screen including the plurality of divided screens in a smaller size than a full display area of a display unit.

The display method may further include: displaying a user interface (UI) which enables selection of a new content to be displayed on the new screen, on the new screen.

The display method may further include: displaying contents that respectively correspond to the plurality of divided screens.

The display method may further include: displaying an automatic content recognition (ACR) list within at least one of the plurality of divided screens; and if one ACR is selected from the ACR list, displaying the selected ACR on a corresponding divided screen.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
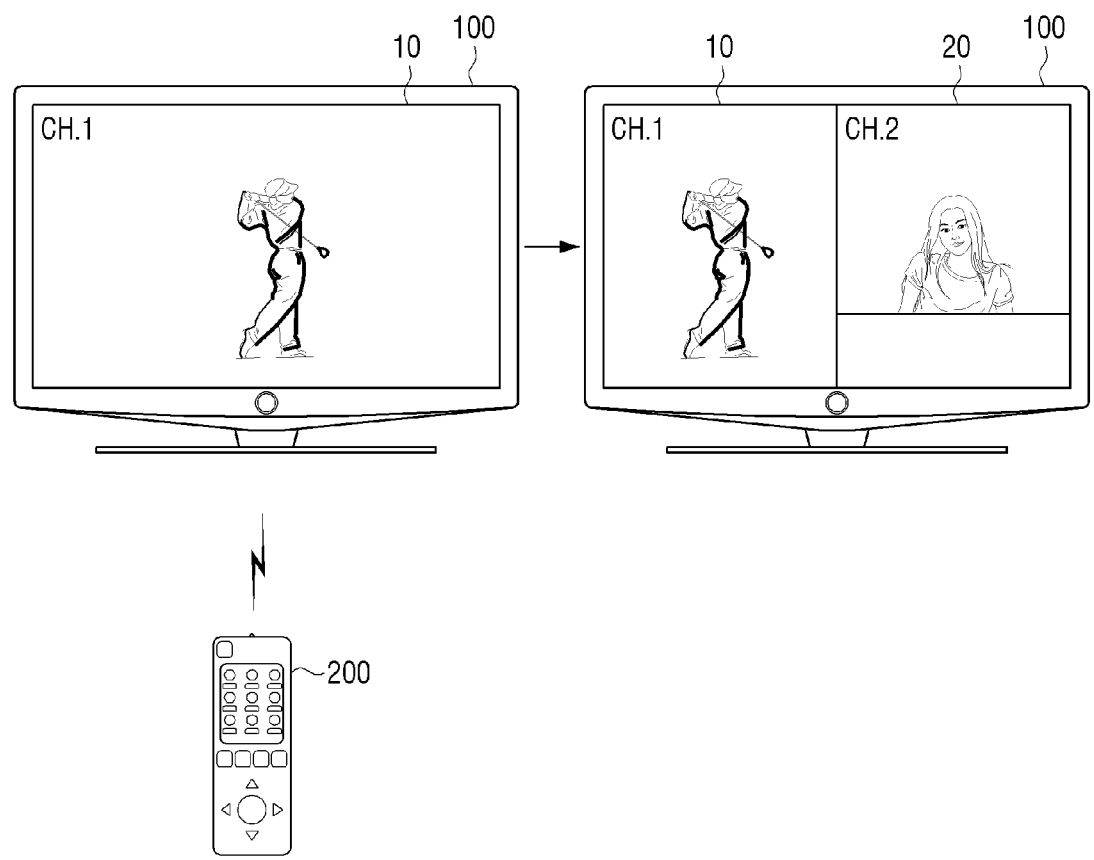
FIG. 1 is a view illustrating a display system according to an exemplary embodiment of the present general inventive concept.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a view illustrating a display system according to an exemplary embodiment of the present general inventive concept. Referring to FIG. 1, the display system includes a display apparatus 100 and a remote controller 200.

The display apparatus 100 may be realized as various types of apparatuses, such as a TV such as a digital TV (DTV) or an Internet Protocol TV (IPTV) a monitor, a laptop PC, a tablet PC, an electronic frame, a mobile phone, a personal digital assistant (PDA), a kiosk PC, etc.

The display apparatus 100 may be controlled by a control signal received from the remote controller 200 by using various methods. For example, the display apparatus 100 may be turned on or turned off and may be changed from a single screen into a plurality of divided screens or from the divided screens into the single screen according to the control signal.

The remote controller 200 may include a plurality of buttons. A user may press at least one or more of the plurality of buttons arranged in the remote controller 200 to control the display apparatus 100.

Figure 2:
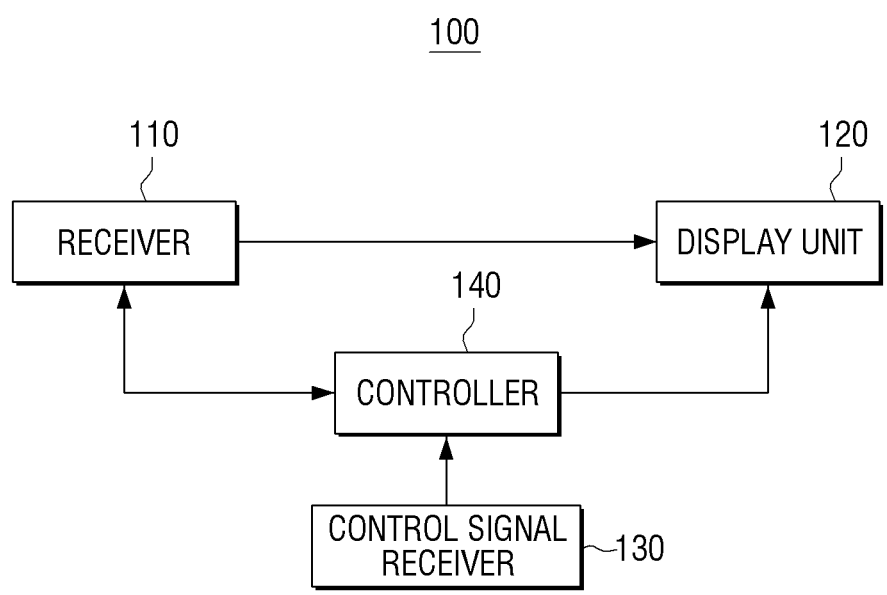
FIG. 2 is a block diagram illustrating a display apparatus according to an exemplary embodiment of the present general inventive concept.

FIG. 2 is a block diagram illustrating the display apparatus 100, according to an exemplary embodiment of the present general inventive concept. Referring to FIG. 2, the display apparatus 100 includes a receiver 110, a display unit 120, a control signal receiver 130, and a controller 140.

The receiver 110 may receive a broadcasting signal. In this case, the broadcasting signal may be transmitted from an external transmitter or at least one or more transmitters. The receiver 110 may receive the broadcasting signal from various types of transmitters according to a type of the display apparatus 100.

For example, if the receiver 110 is realized as a general broadcasting receiver such as a TV, the display apparatus 100 may receive the broadcasting signal from a radio frequency (RF) communication network. Alternatively, if a transmitter is realized as a web server such as an IPTV or other types of apparatuses, the receiver 110 may receive the broadcasting signal through an Internet Protocol (IP) communication network. Also, the display apparatus 100 may simultaneously receive the broadcasting signal received from the RF communication network and the broadcasting signal received from the IP communication network. The broadcasting signal may include contents and information about the contents.

The display unit 120 may display the contents and/or the information included in the received broadcasting signal on a full screen or a divided screen under control of the controller 140. In this case, the divided screen may refer to one of a plurality of screens into which the full screen is divided.

Therefore, the display unit 120 may display a screen including a content and/or information about the content. The display unit 120 may also set a single screen mode or a divided screen mode according to a control of the user. If the single screen mode is set, only one screen may be displayed, and thus the user may experience one content. If the divided screen mode is set, the plurality of screens may be displayed. Therefore, the user may experience a plurality of contents through one display unit 120 at the same time. In this case, only a particular content is not exclusively displayed on one screen, and another content may be displayed on one screen according to a control of the remote controller 200 performed by the user.

The control signal receiver 130 receives various types of control signals from the remote controller 200. The control signal receiver 130 may be realized as various types according to a type of the remote controller 200. For example, if the remote controller 200 is an infrared (IR) remote controller that transmits an IR signal by using an IR lamp, the control signal receiver 130 may be realized as an IR light-receiving sensor that receives and parses an IR signal. If the remote controller is an apparatus that transmits wireless communications by using Bluetooth, Wi-Fi, and near field communications (NFC) modules, the control signal receiver 130 may be realized as a Bluetooth module, a Wi-Fi module, an NFC module, or the like. If the remote controller 200 is connected to the display apparatus 100 through various types of wire interfaces, the control signal receiver 130 may be realized as a wire interface module that receives a control signal through a wire interface.

The user may control the remote controller 200 to control the display unit 120. Therefore, if the remote controller 200 transmits a control signal corresponding to a user control content, the control signal receiver 130 may receive the control signal. The control signal receiver 130 that has received the control signal from the remote controller 200 may transmit the control signal to the controller 140 to control the display unit 120 according to a control of the user. In this case, the control signal may include a screen diving signal or a single screen signal. The screen dividing signal may refer to a signal that is to change a single screen mode, in which only one screen is displayed on a full screen, to a divided screen mode. Also, the single screen signal may refer to a signal that is to change the divided screen mode, in which a plurality of divided screens are displayed, to the single screen mode.

If the screen diving signal is input through the remote controller 200, the controller 140 may divide one screen into a plurality of screens. If the control signal receiver 130 receives the screen dividing signal when only one screen is formed on a full screen to display one content, the full screen may be divided into a plurality of screens. In this case, an existing displayed content may be displayed on one of the plurality of screens, and another content may be displayed in a new screen that is newly added due to the division of the full screen. In the divided screen mode, the controller 140 may control to set the newly added screen of the plurality of screens to a controllable screen that is to be controlled according to the control signal and distinguish the controllable screen from the others of the plurality of screens. In other words, the controller 140 may control to adjust dimming of the new screen added by the screen dividing signal, so that the new screen has higher luminance than an existing screen. Also, the controller 140 may control to list at least one application, which may be executed on the newly added screen, on a side of the newly added screen. This will be described later.

If the single screen signal is input through the remote controller 200 in the divided screen mode, the controller 140 may change the divided screen mode to the single screen mode. In other words, if the control signal receiver 130 receives the control signal when a plurality of divided screens are formed to display a plurality of contents, the plurality of divided screens may be changed into a single screen. In this case, only one of the plurality of contents may be displayed on the single screen.

Figure 3:
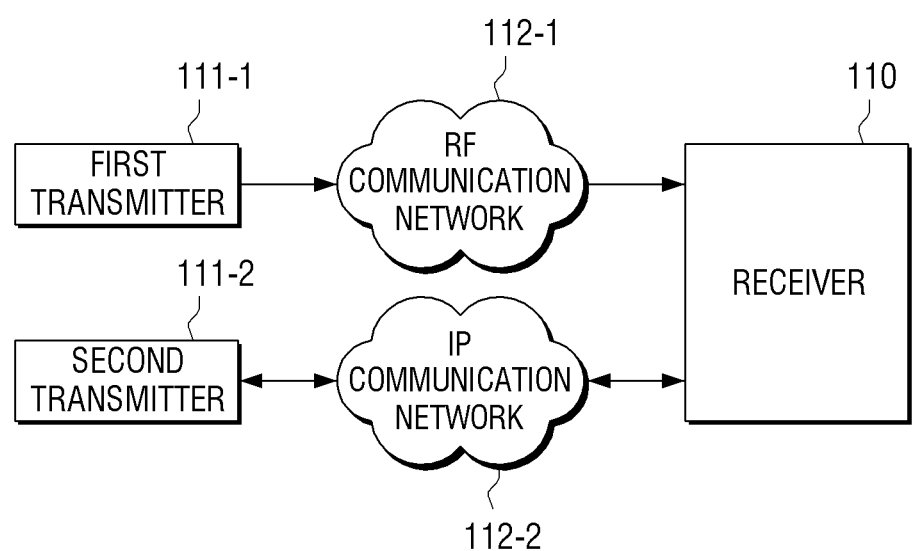
FIG. 3 is a block diagram illustrating a display system according to an exemplary embodiment of the present general inventive concept.

FIG. 3 is a block diagram illustrating a display system according to an exemplary embodiment of the present general inventive concept. Referring to FIG. 3, the display system includes a plurality of transmitters 111-1 and 111-2. Only one receiver 110 is illustrated in FIG. 3, but a plurality of receivers 110 may be provided.

The plurality of transmitters 111-1 and 111-2 transmits signals through different types of communication networks. In FIG. 3, the first transmitter 111-1 transmits a signal through an RF communication network 112-1, and the second transmitter 111-2 transmits a signal through an IP communication network 112-2. However, types of communication networks are not limited. For convenience of description, the signal transmitted by the first transmitter 111-1 is referred to as a first signal, and the signal transmitted by the second transmitter 111-2 is referred to as a second signal.

The first and second signals may respectively include data that is distinguished to form contents. For example, the first signal may include a moving picture content, and the second signal may be include webpage data or various types of application execution screen data. The controller 140 controls the receiver 110 to selectively receive the signal transmitted from the first transmitter 111-1 or the second transmitter 111-2 according to a user's selection. Data included in the received first or second signal may be displayed on a full screen or each of divided screens.

A method and an element for transmitting a signal through the RF communication network 112-1 may be differently realized according to broadcasting standards. In other words, digital broadcasting standards include an Advanced Television System Committee (ATSC), Digital Video Broadcasting (DVD), and Integrated Services Digital broadcasting-terrestrial (ISDB-T) methods, etc.

Detailed structure and operation of the first transmitter 111-1 that transmits the first signal through the RF communication 112-1 may vary according to which one of the above-described broadcasting standards has been applied. Structure and operation of the receiver 110 may also vary according to which one of the above-described broadcasting standards has been applied. For example, if the ATSC standard is used, the first transmitter 111-1 may include a randomizer, an RS encoder, a data interleaver, a trellis encoder, a sync and pilot inserter, an 8VSB modulator, an RF up-converter, an antenna, or the like. The receiver 110 may include an antenna, an RF up-converter, a demodulator, an equalizer, a demultiplexer, an RS decoder, deinterleaver, or the like. Detailed structures for transmitting and receiving signals according to respective broadcasting standards are disclosed in standard documents of the respective broadcasting standards, and thus their detailed illustrations and descriptions are omitted.

The second transmitter 111-2 transmits the second signal including additional data to the receiver 110 through the IP communication network 112-2. The IP communication network 112-2 may be realized as various types of networks such as a cloud network, a local network, etc. The second transmitter 111-2 may transmit the second signal by using a streaming method. In detail, various types of streaming methods, such as Real Time Protocol (RTP), Hypertext Transfer Protocol (HTTP), etc., may be used. According to another exemplary embodiment, the second transmitter 111-2 may provide the additional data by using a downloading method. If the downloading method is used, a file format may be various types such as AVI, MP4, MPG, MOV, WMV, etc.

Figure 4:
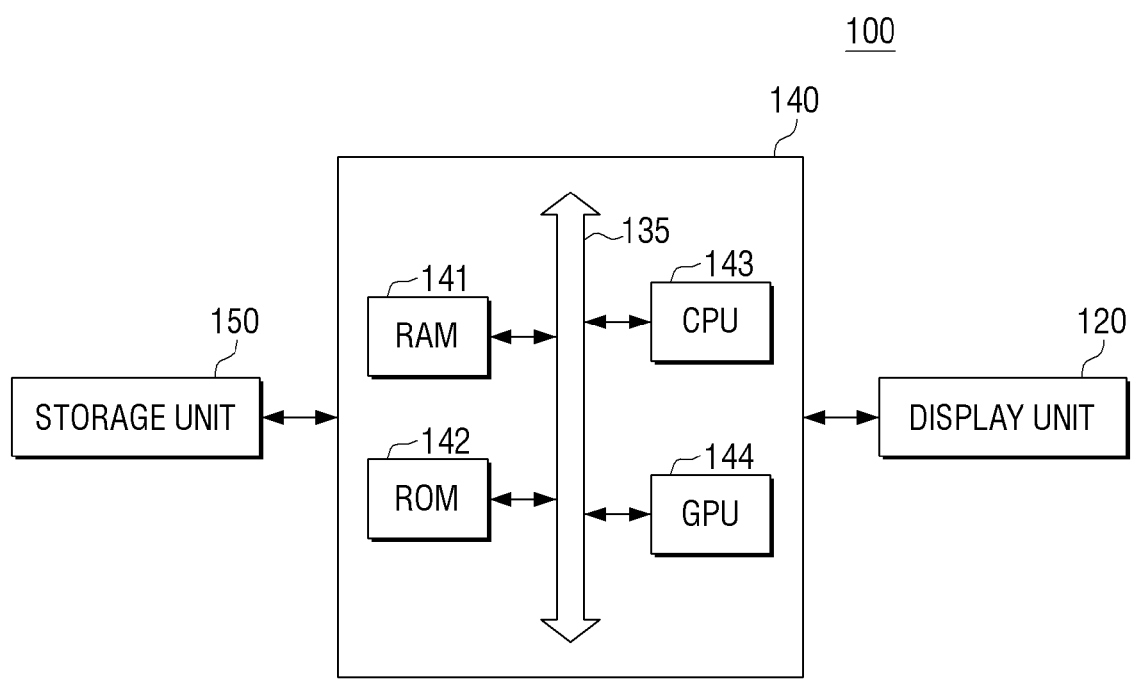
FIG. 4 is a block diagram illustrating a display apparatus according to another exemplary embodiment of the present general inventive concept.

FIG. 4 is a block diagram illustrating the display apparatus 100, according to another exemplary embodiment of the present general inventive concept.

Referring to FIG. 4, the display apparatus 100 includes a display unit 120, a controller 140, and a storage unit 150.

The storage unit 150 is an element that stores various types of programs and data necessary for operation of the display apparatus 100. In detail, the storage unit 150 may store various types of control commands, etc. corresponding to a control signal transmitted from the remote controller 200.

The display unit 120 displays various types of screens as described above. The display unit 120 may be realized as various types of displays such as a liquid crystal display (LCD), an organic light-emitting diode (OLED), a plasma display panel (PDP), etc. The display unit 120 may include a driving circuit that may be realized as a type such as an amorphous silicon (a-si) thin film transistor (TFT), a low temperature poly silicon (LTPS) TFT, or an organic TFT (OTFT), or the like, a backlight unit, etc.

The controller 140 controls an overall operation of the display apparatus 100 by using the various types of programs and data stored in the storage unit 150. The controller 140 includes a random access memory (RAM) 141, a read only memory (ROM) 142, a central processing unit (CPU) 143, a graphic processing unit (GPU) 144, and a bus 135. The RAM 141, the ROM 142, the CPU 143, and the GPU 144 may be connected to one another through the bus 135.

The CPU 143 accesses the storage unit 150 to perform booting by using an operation system (O/S) stored in the storage unit 150. The CPU 143 performs various operations by using various types of programs, contents, data, etc. stored in the storage unit 150.

The ROM 142 stores a command set, etc. for booting a system. If power is supplied through an input of turn-on command, the CPU 143 copies the O/S, which is stored in the storage unit 150, into the RAM 141 according to a command stored in the ROM 142 and executes the O/S to boot the system. If the system is completely booted, the CPU 143 copies the various types of programs, which are stored in the storage unit 150, into the RAM 141 and executes the programs copied into the RAM 141 to perform various types of operations If the display apparatus 100 is completely booted, the GPU 144 displays a content screen, a search result screen, or the like. In detail, the GPU 144 may generate a screen including various types of objects such as an icon, an image, a text, etc. by using a calculator (not shown) and a renderer (not shown). The calculator calculates attribute values, such as coordinate values where objects are to be displayed, shapes, sizes, and colors of the objects, etc., according to a layout of the screen. The renderer generates a screen that has various types of layouts and includes objects, based on the attribute values calculated by the calculator. The screen generated by the renderer is provided to the display unit 120 to be displayed within a display area.

The CPU 143 may determine a screen mode according to a control signal received through the control signal receiver 130.

A method of determining the screen mode may be variously realized according to exemplary embodiments. For example, the remote controller 200 may include various types of buttons. The buttons may include a first button for selecting a single screen mode and a second button for selecting a divided screen mode. The remote controller 200 transmits a full screen signal if the first button is selected and transmits a screen dividing signal if the second button is selected. If the full screen signal is received through the control signal receiver 130, the CPU 143 may determine a single screen mode. If the screen dividing signal is received, the CPU 143 may determine a divided screen mode.

According to another exemplary embodiment, a mode may be determined according to an amount of time a button of the remote controller 200 is pressed. For example, if the button of the remote controller 200 is pressed long for a preset threshold time, the CPU 143 may determine that the screen diving signal has been input and set the single screen mode. Alternatively, if the button of the remote controller 200 is pressed short for less than a threshold time, the CPU 143 may determine that the full screen signal has been input and set the divided screen mode. The CPU 143 may count button press durations by using a timer installed in the controller 140.

Here, the threshold time may be determined as various values. For example, the threshold time may be set to about 2 seconds but is not limited thereto. Also, the button may be a particular button to which a dividing signal has been mapped or may be a button to which a different function, such as a numerical button or a direction button, has been mapped. If the button is the button to which the different function has been mapped, the CPU 143 may perform a function mapped to the button when the button is pressed short and perform a screen dividing operation when the button is pressed long. If the corresponding button is pressed short when a screen is divided, the CPU 143 may change divided screens into one original screen In the above-described exemplary embodiment, the controller 140 counts the button press durations and operates in different modes according to the counted button press durations. However, the remote controller 200 may count the button press durations to selectively transmit a divided screen signal or a full screen signal according to the counted button press times. In this case, if the screen dividing signal is transmitted from the remote controller 200, the CPU 143 may detect a control command corresponding to the screen dividing signal from the storage 150 to perform a screen diving operation.

According to another exemplary embodiment, the remote controller 200 may include a plurality of buttons to which a screen dividing function has been mapped. The buttons may be color buttons to which different colors are allocated or buttons where different texts, symbols, numbers, etc. are drawn on surfaces thereof. If one of the plurality of buttons is pressed long for a preset threshold time, the CPU 143 may determine that a screen dividing signal has been input. Therefore, a full screen may be divided into a plurality of screens to add a new screen. Here, the new screen may immediately display a content that is provided from a source matching with a button that is pressed long. For example, if a button to which a web browser function has been mapped is pressed long, the controller 140 may divide a screen and display a web screen that is provided from a web server to which the button has been mapped.

As described above, the CPU 143 may determine a signal transmitted from the remote controller 200 by using various methods to determine a mode. The CPU 143 may control the GPU 144 to display screens having the number, sizes, and shapes matching with the determined mode according to the determined mode. In other words, if a web function is executed in a single screen mode, the GPU 144 renders a web screen on a full screen area. If the web function is executed on one of a plurality of divided screens in a divided screen mode, the GPU 144 renders the web screen only on the one divided screen. The GPU 144 may render various types of application execution screens besides the web screen.

If a broadcasting signal transmitted from a TV station is to be displayed, the CPU 143 may display a broadcasting screen that has been processed by a video processor (not shown) of the display apparatus 100. Even in this case, broadcasting screens having various sizes and numbers may be displayed. In other words, if a TV reception function is executed in the single screen mode, the CPU 143 controls the video processor and the display unit 120 to display a broadcasting screen in a full screen area. If the web function is executed on one of the plurality of divided screens in the divided screen mode, the GPU 144 renders the web screen only on the one divided screen. The GPU 144 may render various types of application execution screens besides the web screen.

Figure 5:
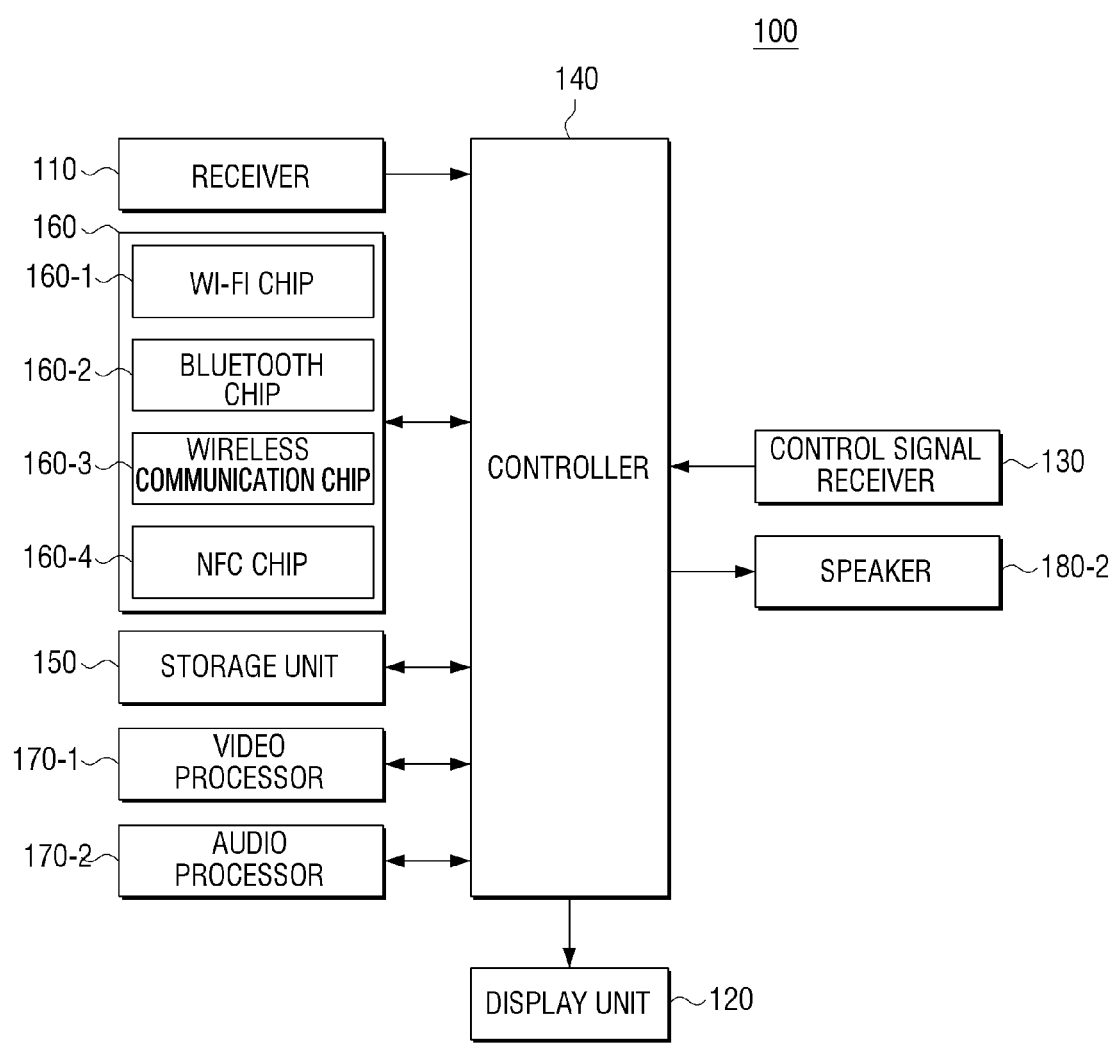
FIG. 5 is a block diagram illustrating a display apparatus comprehensively include various types of elements, according to another exemplary embodiment of the present general inventive concept.

FIG. 5 is a block diagram illustrating the display apparatus 100 that comprehensively includes various types of elements, according to another exemplary embodiment of the present general inventive concept.

Referring to FIG. 5, the display apparatus 100 includes the display unit 120, the controller 140, the receiver 110, a communicator 160, the storage unit 150, a video processor 170-1, an audio processor 170-2, the control signal receiver 130, a remote control receiver 180-1, and a speaker 180-2.

The display unit 120 may be realized as a general LCD or OLED or may be realized as a touch screen. If the display unit 120 is realized as the touch screen, a user may touch a screen to control an operation of the display apparatus 100.

The control signal receiver 130 may receive a control signal from an external controller. In this case, the external controller may be a remote controller. The control signal receiver 130 may receive a control signal or a manipulation signal transmitted from an external remote controller and transmit the control signal or the manipulation signal to the controller 140. In this case, the control signal receiver 130 may be formed in an arbitrary area such as a front part, a side part, a back part, or the like of an outer part of a body of the display apparatus 100.

The controller 140 controls an overall operation of the display apparatus 100 by using various types of programs and data stored in the storage unit 150. The display unit 120 and the controller 140 have been described in detail in the above exemplary embodiments, and thus their repeated descriptions are omitted.

The communicator 160 is an element that communicates with various types of external apparatuses according to various types of communication methods. The communicator 160 includes a Wi-Fi chip 160-1, a Bluetooth chip 160-2, a wireless communication chip 160-3, and an NFC chip 160-4.

The Wi-Fi chip 160-1 and the Bluetooth chip 160-2 respectively perform communications by using a Wi-Fi method and Bluetooth method. If the Wi-Fi chip 160-1 or the Bluetooth chip 160-2 is used, the communicator 160 may transmit and receive various types of connection information such as a subsystem identification (SSID), a session key, etc. to perform a communication connection by using the various types of connection information in order to transmit and receive various types of information. The wireless communication chip 160-3 refers to a chip that performs communications according to various communication standards such as IEEE, Zigbee, 3rd Generation (3G), 3rd Generation Partnership Project (3GPP), Long Term Evolution (LTE), etc. The NFC chip 160-4 refers to a chip that operates in an NFC method using a band of 13.56 MHz among various types of RFID frequency bands such as 135 kHz, 13.56 MHz, 433 MHz, 860-960 MHz, 2.45 GHz, etc.

The communicator 160 may communicate with various types of external server apparatuses such as a search server, etc. Therefore, the communicator 160 may transmit or receive various types of search words and receive search results related to the search words. The communicator 160 may also directly communicate with various types of external apparatuses (other than the server apparatuses) to perform searches. If the remote controller 200 includes a communication module as described above, the display apparatus 100 may receive various types of control signals through the communicator 160.

The video processor 170-1 is an element that processes video data included in a content received through the communicator 160 or in a content stored in the storage unit 150. In other words, the video processor 170-1 may perform various types of image-processing, such as decoding, scaling, noise filtering, frame rate conversion, resolution conversion, etc., on the video data. In this case, the display unit 120 may display an image frame generated by the video processor 170-1.

The audio processor 170-2 is an element that processes audio data included in the content received through the communicator 160 or in the content stored in the storage unit 150. The audio processor 170-2 may perform various types of processing, such as decoding, amplifying, noise filtering, etc., on the audio data.

If a broadcasting program is received through the receiver 110, the controller 140 may control the video processor 170-1 and the audio processor 170-2 to demultiplex the broadcasting program in order to respectively extract video data and audio data and to respectively decode the extracted video data and audio data in order to play the broadcasting program.

The speaker 180-2 outputs the audio data generated by the audio processor 170-2.

According to exemplary embodiments, although not shown in FIG. 5, the display apparatus 100 may further include a universal serial bus (USB) port to which a USB connector may be connected, various types of external input ports that are connected to various types of external terminals such as a headset, a mouse, a LAN, etc., and a digital multimedia broadcast (DMB) chip that receives and processes a DMB signal, etc.

As described above, a display apparatus may be realized as various types.

Figure 6:
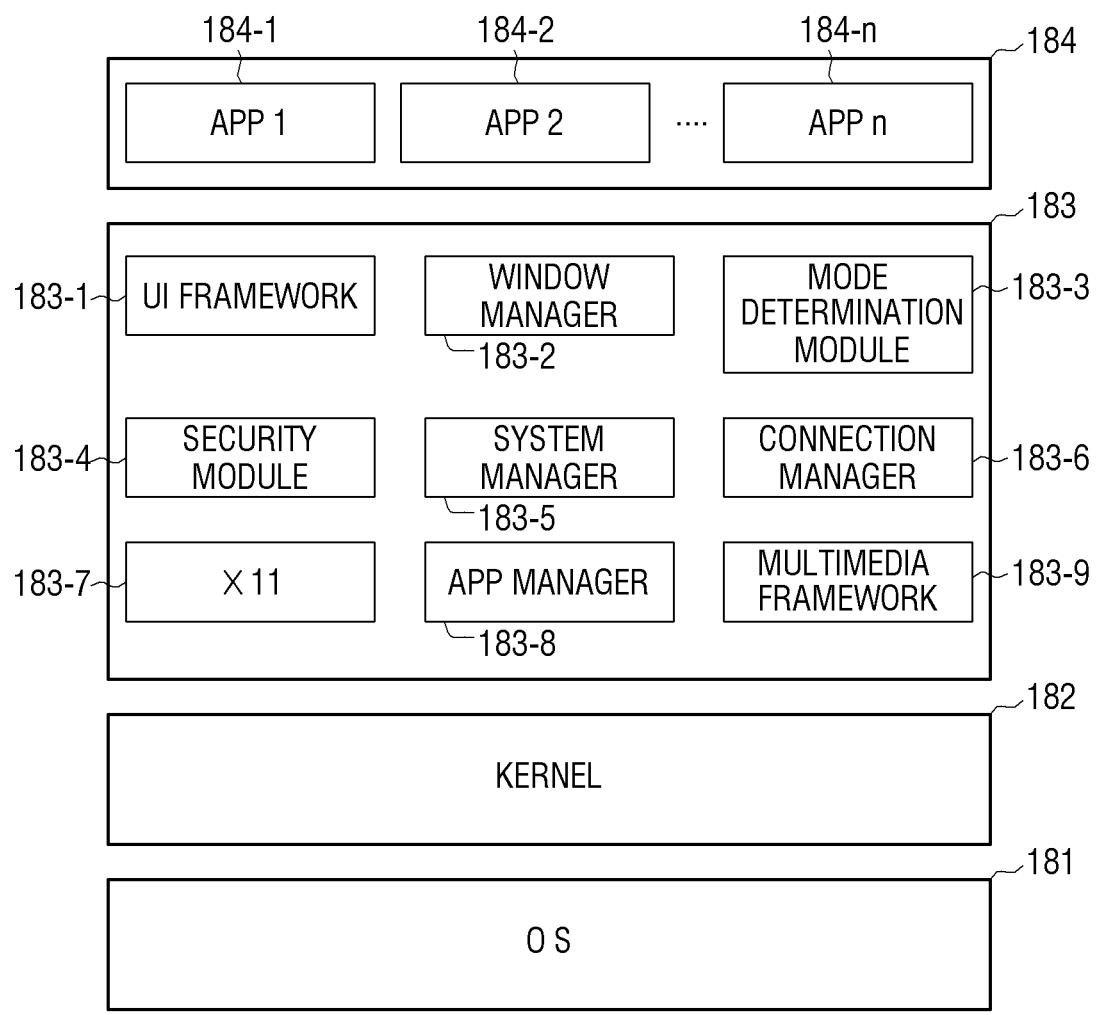
FIG. 6 is a block diagram illustrating a software architecture that is used by a display apparatus, according to an exemplary embodiment of the present general inventive concept.

FIG. 6 is a block diagram illustrating a software architecture that is used by a display apparatus, according to an exemplary embodiment of the present general inventive concept.

Software of FIG. 6 may be stored in the storage unit 150 but is not limited thereto. The software may be stored in various types of storage means that are used in the display apparatus 100. Referring to FIG. 6, the display apparatus 100 may store software that includes an OS 181, a kernel 182, middleware 183, an application 184, etc.

The OS 181 performs a function of controlling and managing an overall operation of hardware. In other words, the OS 181 is a layer that takes charge of basic functions such as a hardware management, memory, security, etc.

The kernel 182 operates as a path for transmitting various types of signals, which are sensed by a sensor (not shown), etc., to the middleware 183.

The middleware 183 includes various types of software modules that control an operation of the display apparatus 100. Referring to FIG. 6, the middleware 183 includes a user interface (UI) framework 183-1, a window manager 183-2, a mode determination module 183-3, a security module 183-4, a system manager 183-5, a connection manager 183-6, an X11 module 183-7, an APP manager 183-8, and a multimedia framework 183-9

The UI framework 183-1 is a module that provides various types of UIs. The UI framework 183-1 may include an image compositor module that forms various types of objects, a coordinate compositor module that calculates coordinates on which the objects are to be displayed, a rendering module that renders the formed objects on the calculated coordinates, a 2-dimensional (2D)/3-dimensional (3D) UI toolkit that provides a tool for forming a 2D or 3D UI, etc.

The window manager 183-2 may sense various types of input events such as a control signal transmitted from the remote controller 200, a user's touch on a screen of the display unit 120, a control of a button of the display apparatus 100, etc. If such an event occurs, the window manager 183-2 transmits an event signal to the UI framework 183-1 to allow the UI framework 183-1 to perform an operation corresponding to the event. In detail, if an event where a screen diving signal has been input occurs, the window manager 183-2 informs the UI framework 183-1 that the event has occurred. The UI framework 183-1 may divide a full screen into a plurality of divided screens having various numbers, sizes, and shapes according to the screen dividing signal.

The mode determination module 183-3 is a module that determines whether the display apparatus 100 is in a single screen mode or a divided screen mode, based on a signal transmitted from the remote controller 200 as described above. The mode determination module 183-3 may control a timer or the like to determine whether a button of the display apparatus 100 has been pressed long or short.

The security module 183-4 is a module that supports certification, permission for a request, a secure storage, etc.

The system manager 183-5 monitors states of elements of the display apparatus 100 and provides the monitoring result to other modules. For example, if a residual amount of a battery is at a minimum, an error occurs, or a communication connection is disconnected, the system manager 183-5 may provide the monitoring result to the UI framework 183-1 to output a notification message or a notification sound.

The connection manager 183-6 is a module that supports a wire or wireless network connection. The connection manager 183-6 may include various types of detailed modules such as a DNET module, UPnP module, etc The X11 module 183-7 is a module that receives various types of event signals from various types of hardware installed in the display apparatus 100. Here, an event may be variously set like an event where a user control is sensed, an event where a system alarm occurs, an event where a particular program is executed or ended, etc.

The APP manager 183-8 is a module that manages execution states of various types of applications installed in the storage unit 150. If an event where an application execution command is input from the X11 module 183-7 is sensed, the APP manager 183-8 calls and executes an application corresponding to the corresponding event. If an event where at least one object is selected on a screen is sensed, the APP manager 183-8 calls and executes an application corresponding to the selected object.

The multimedia framework 183-9 is a module that plays a multimedia content stored in the display apparatus 100 or provided from an external source. The multimedia framework 183-9 may include a player module, a camcorder module, a sound processing module, etc. Therefore, the multimedia framework 183-9 plays various types of multimedia contents to generate and play a screen and a sound.

The software architecture of FIG. 6 is only an example and thus is not necessarily limited thereto. Therefore, a portion of the software architecture may be omitted, modified, or added. For example, the storage unit 150 may further include various types of programs such as a sensing module for analyzing signals sensed by various types of sensors, a messaging module such as a messenger program, a Short Message Service (SMS) & Multimedia Message Service (MMS) program, an e-mail program, or the like, a call info aggregator program module, VoIP module, a web browser module, etc.

FIGS. 7A through 7F are views illustrating an operation of the display apparatus 100 according to various exemplary embodiments of the present general inventive concept. In FIGS. 7A through 7F, the display apparatus 100 is controlled by two types of remote controllers 200-1 and 200-2. The first remote controller 200-1 includes only one screen diving button 220-1, and the second remote controller 220-2 includes a plurality of screen dividing buttons 220-2. In FIGS. 7A through 7F, control processes performed by the two types of remote controllers 200-1 and 200-2 will be respectively described, and common operations performed by the two types of remote controllers 200-1 and 200-2 will be described.

Figure 7A:
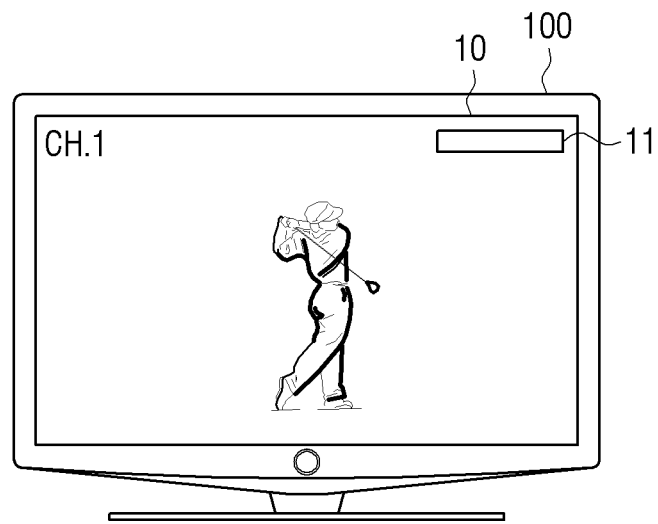
FIGS. 7A through 7F are views illustrating a screen of a display apparatus according to an exemplary embodiment of the present general inventive concept.
Figure 7A:
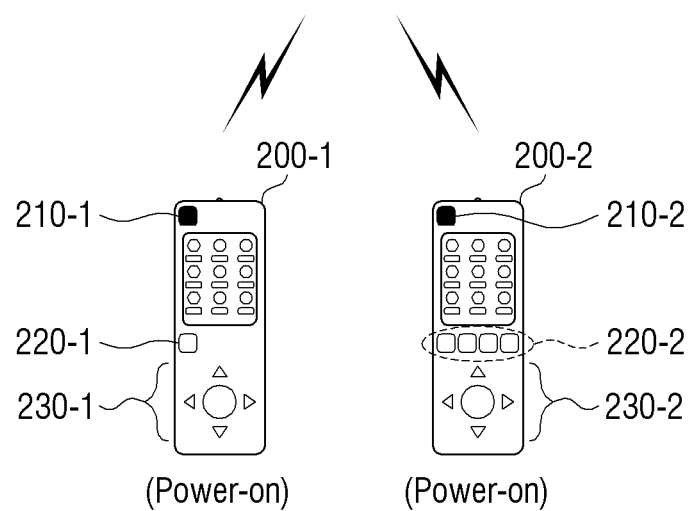

As shown in FIG. 7A, if a user presses power buttons 210-1 and 210-2 of the first and second remote controllers 200-1 and 200-2, the display apparatus 100 is turned on, and thus preset singular content is displayed on a full screen. The first and second remote controllers 200-1 and 200-2 may respectively include the power buttons 210-1 and 210-2, the screen diving buttons 220-1 and 220-2, and direction buttons 230-1 and 230-2. If the user presses the power buttons 210-1 and 210-2, the display apparatus 100 may be turned on.

If the display apparatus 100 is turned on, one screen is displayed in a full screen area. The screen displayed in the frill screen area due to the turn-on of the display apparatus 100 may be a screen that was last displayed before the display apparatus 100 was turned off. Also, the screen displayed in the full screen area due to the turn-on of the display apparatus 100 may be variously set by the user. A first setting screen 11 may be formed in an area of one screen. The setting screen 11 will be described later.

Figure 7B:
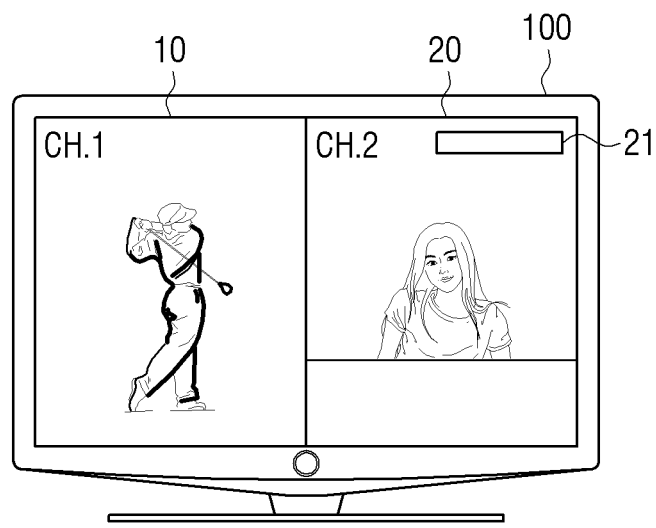
Figure 7B:
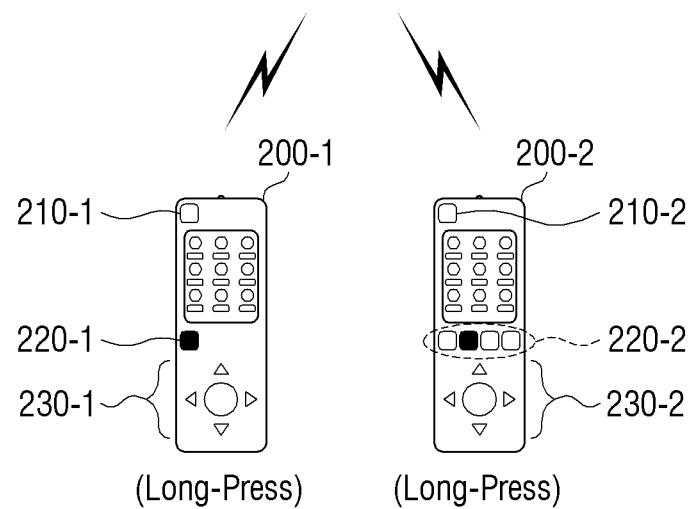

According to an exemplary embodiment, as shown in FIG. 7B, the first remote controller 200-1 includes only one screen dividing button 220-1. If the user presses the screen diving button 220-1, a screen may be divided into two screens, and the two screens may be displayed as shown in FIG. 7B. In other words, if the screen dividing button 220-1 is pressed long for a preset threshold time, the display apparatus 100 may determine that a screen diving signal has been input. Therefore, a hill screen may be divided into a first divided screen 10 and a second divided screen 20. The first divided screen 10 may be a screen that is displayed before the screen diving button 220-1 is pressed, and the second divided screen 20 may be a new screen that is added in a divided screen mode. In this case, the new screen may be pre-set by the user. If the second divided screen 20 is displayed, the first setting screen 11 may disappear, and a second setting screen 21 may be displayed on a side of the second divided screen 20.

According to another exemplary embodiment, the second remote controller 200-2 may include a plurality of screen dividing buttons 220-2. Colors, sizes, shapes, positions, etc. of the plurality of screen dividing buttons 220-2 may be variously set. The plurality of screen dividing buttons 220-2 may be realized as four color buttons in FIGS. 7A through 7F.

Figure 7C:
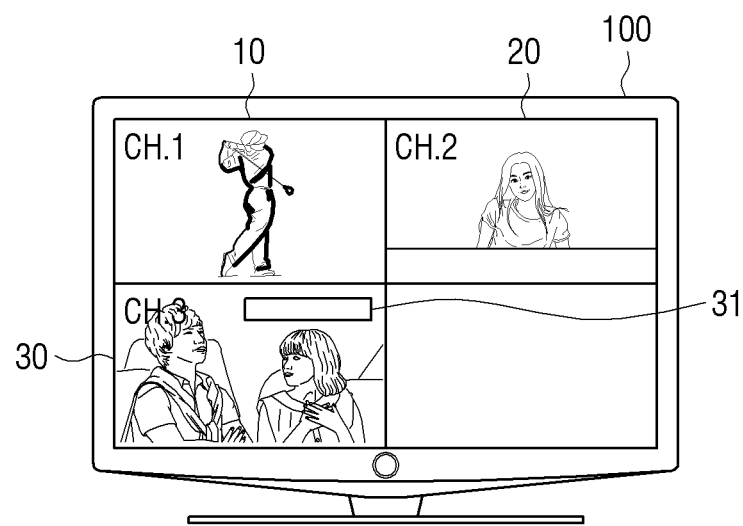
Figure 7C:
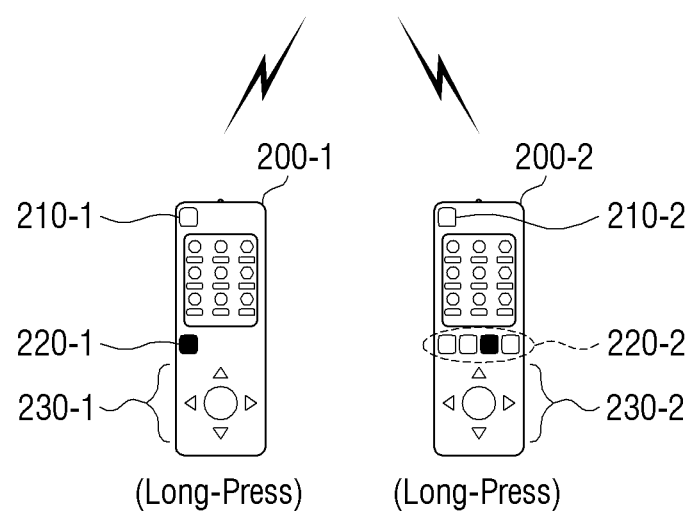

Except the screen dividing buttons 220-1 and 220-2, the other buttons may be provided like buttons of a general remote controller to perform the same functions as the buttons of the general remote controller. A plurality of color buttons may respectively match with a plurality of screen dividing screens. In this case, if one of the plurality of screen dividing buttons 220-2 is pressed long for a preset threshold time or more, the controller 140 may determine that a screen diving signal has been input and divide a full screen into a plurality of divided screens to add a new screen. The new screen may display a content that is provided from a source matching with the long-pressed button. In this case, the source refers to an external apparatus that may provide a content. For example, the source may be various types of external apparatuses such as a broadcasting channel, a digital versatile disc (DVD), a computer device, a web server, a PC, a mobile phone, etc. As shown in FIG. 7B, if one of the plurality of screen diving buttons 220-2 matching with the second divided screen 20 is pressed long for a preset threshold time, the second divided screen 20 may be displayed. According to an exemplary embodiment, if the full screen is divided as shown in FIG. 7B, and the screen diving button 220-*i* of the first remote controller 200-*i* is pressed long once more, a third divided screen 30 may be displayed as shown in FIG. 7C. In this case, the second setting screen 21 may disappear, and a third setting screen 31 may be displayed on a side of the third divided screen 30.

According to another exemplary embodiment, if one of the plurality of screen dividing buttons 220-2 of the second remote controller 200-2 matching with the third divided screen 30 is pressed long for a preset threshold time, the third divided screen 30 may be displayed.

Figure 7D:
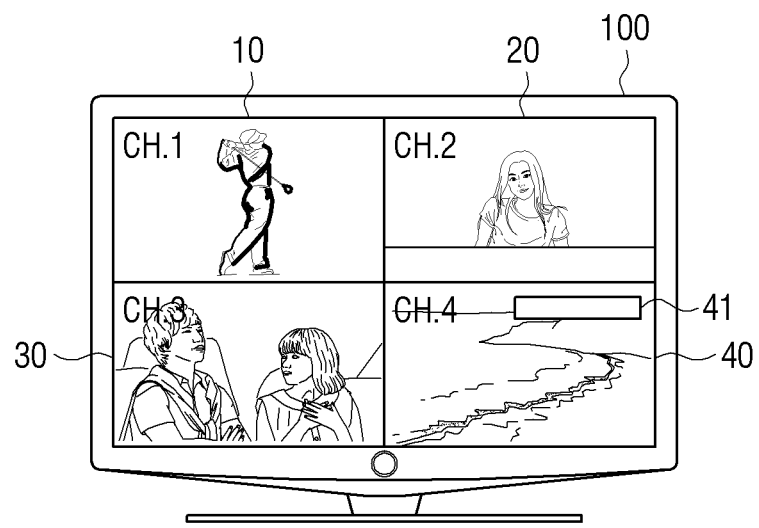
Figure 7D:
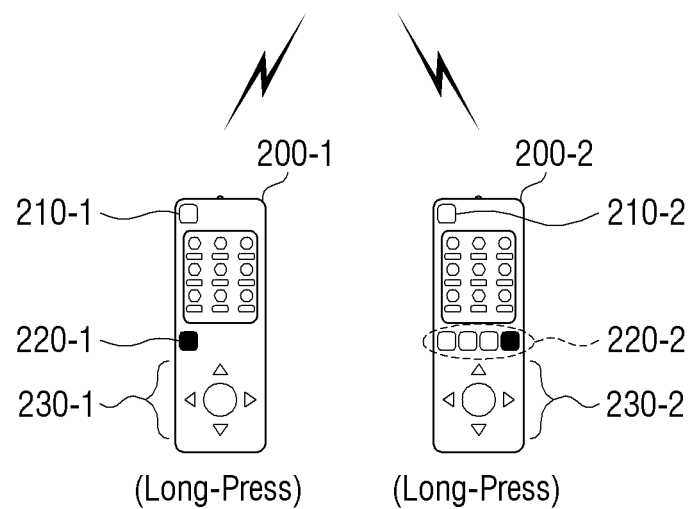

If the full screen is divided as shown in FIG. 7C, and the screen dividing button 220-1 of the first remote controller 200-1 is pressed long once more, a fourth divided screen 40 may be displayed as shown in FIG. 7D. In this case, the third setting screen 31 may disappear, and a fourth setting screen 41 may be displayed on a side of the fourth setting screen 40.

According to another exemplary embodiment, if one of the plurality of screen dividing buttons 220-2 of the second remote controller 200-2 matching with the fourth divided screen 40 is pressed long for a preset threshold time, the fourth divided screen 40 may be displayed.

Figure 7E:
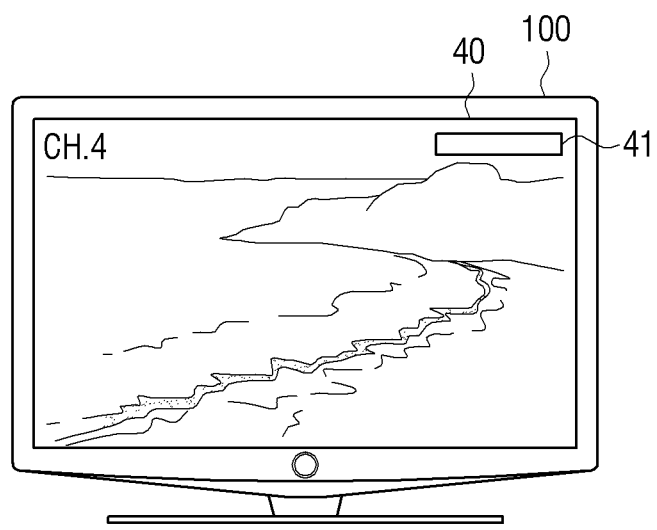
Figure 7E:
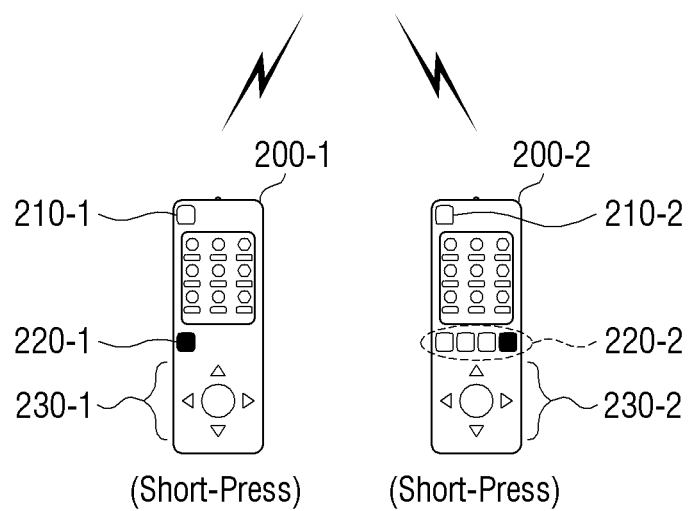

If a screen is divided into the various numbers of divided screens as shown in FIGS. 7B, 7C, and 7D, and the screen diving button 220-1 of the first remote controller 200-1 or one of the plurality of screen dividing screens 220-2 of the second remote controller 200-2 is pressed for a short time, a divided screen mode may be changed to a single screen mode as shown in FIG. 7E. If the divided screen mode is changed to the single screen mode, the controller 140 may separately display the fourth divided screen 40, which is a divided screen lastly added in the divided screen mode, as a full screen. In this case, the fourth setting screen 41 may be displayed in an area of the full screen.

Figure 7F:
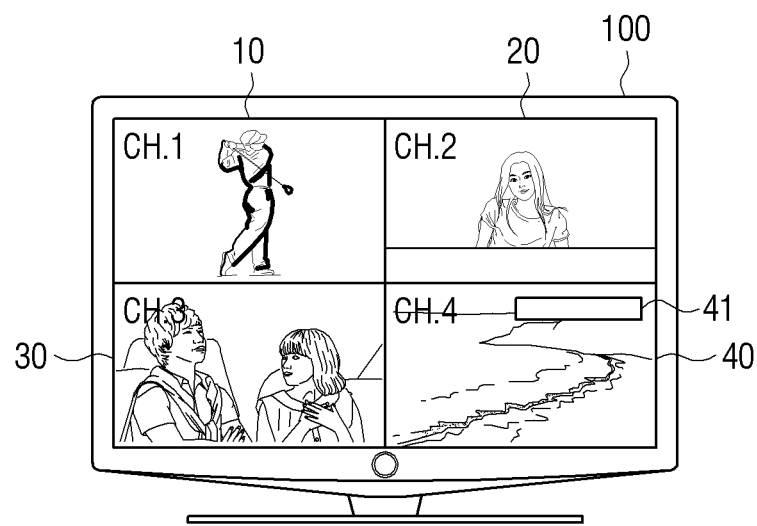
Figure 7F:
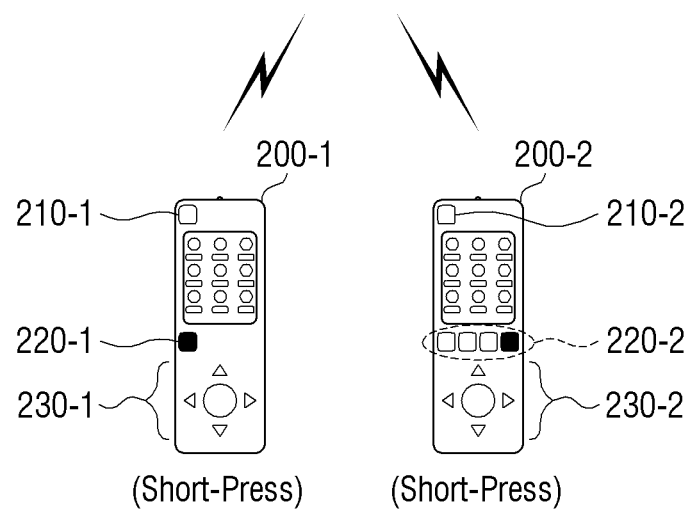

If a screen as shown in FIG. 7E is displayed, and the screen dividing button 220-*i* of the first remote controller 200-1 or one of the plurality of screen dividing buttons 220-2 of the second remote controller 200-2 is pressed short or long once more, the single screen mode may be changed to the divided screen mode as shown in FIG. 7F. In other words, if the screen dividing button 220-1 is pressed short or long in the single screen mode, the single screen mode may be changed to the divided screen mode. Therefore, the single screen mode may be changed to the divided screen mode to display a full screen that is displayed before the divided screen mode is changed to the single screen mode. In this case, the fourth setting screen 41 may be displayed on a side of the fourth divided screen 40.

As shown in FIGS. 7A through 7F, if the screen dividing buttons 220-1 and 220-2 are pressed long when the display apparatus 100 is turned on by a power button in the single screen mode, a new divided screen may be added as a new screen and displayed. If the screen dividing buttons 220-*i* and 220-2 are pressed short in the divided screen mode, the divided screen mode may be changed to the single screen mode to display a lastly added new screen as a full screen. If the screen dividing buttons 220-1 and 220-2 are pressed short or long in the single screen mode, the single screen mode may be changed to the divided screen mode to display a divided screen that has been displayed before the divided screen mode is changed to the single screen mode.

Also, the controller 140 may sequentially and differently adjust the number of divided screens according to the number of inputs of a screen diving signal. For example, if the screen diving signal is input one time, a full screen may be divided into two screens. If the screen diving signal is input two times, the full screen may be divided into four screens. If the screen dividing signal is input three times, the full screen may be divided into six or eight screens. Alternatively, if the screen dividing signal is input n times, the full screen may be divided into n screens.

Four divided screens are illustrated in FIGS. 7A through 7F, but more than four divided screens may be displayed.

Divided screens shown in FIGS. 7A through 7F may separately display contents respectively corresponding to the divided screens. For example, if a full screen is divided into four divided screens, each of the fourth divided screens may display a moving picture of a content corresponding to the divided screen.

Figure 8:
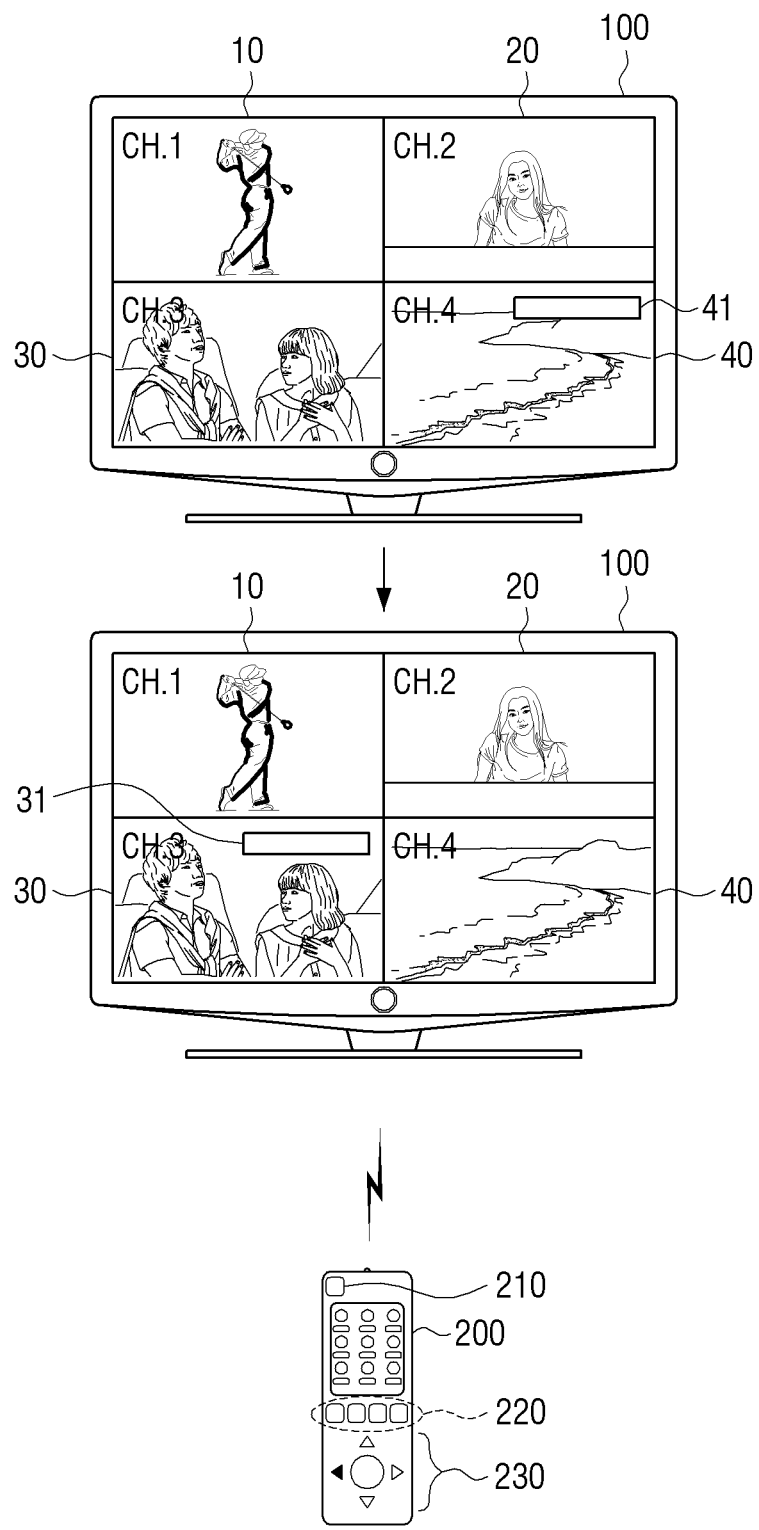
FIG. 8 is a view illustrating a screen of a display apparatus according to another exemplary embodiment of the present general inventive concept.

FIG. 8 is a view illustrating a screen of the display apparatus 100 according to another exemplary embodiment of the present general inventive concept.

Referring to FIG. 8, a remote controller 200 includes direction buttons 230. The direction buttons 230 may include a left button, a right button, an upper button, a lower button, and a selection button. In this case, if a direction signal is input from the remote controller 200, the controller 140 may control the display unit 120 to change one of a plurality of divided screens, which is to be controlled, according to the direction signal. Therefore, in a divided screen mode, a user may select a screen, which is to be controlled, through the direction buttons 230. In other words, if a fourth divided screen 40 is a newly added screen, a fourth setting screen 41 may be displayed on a side of the fourth divided screen 40. If the user presses the left button in this state, the fourth setting screen 41 disappears, and a third setting screen 31 is displayed. If the user presses the selection button in this state, the screen to be controlled may be a third divided screen 30.

Figure 9:
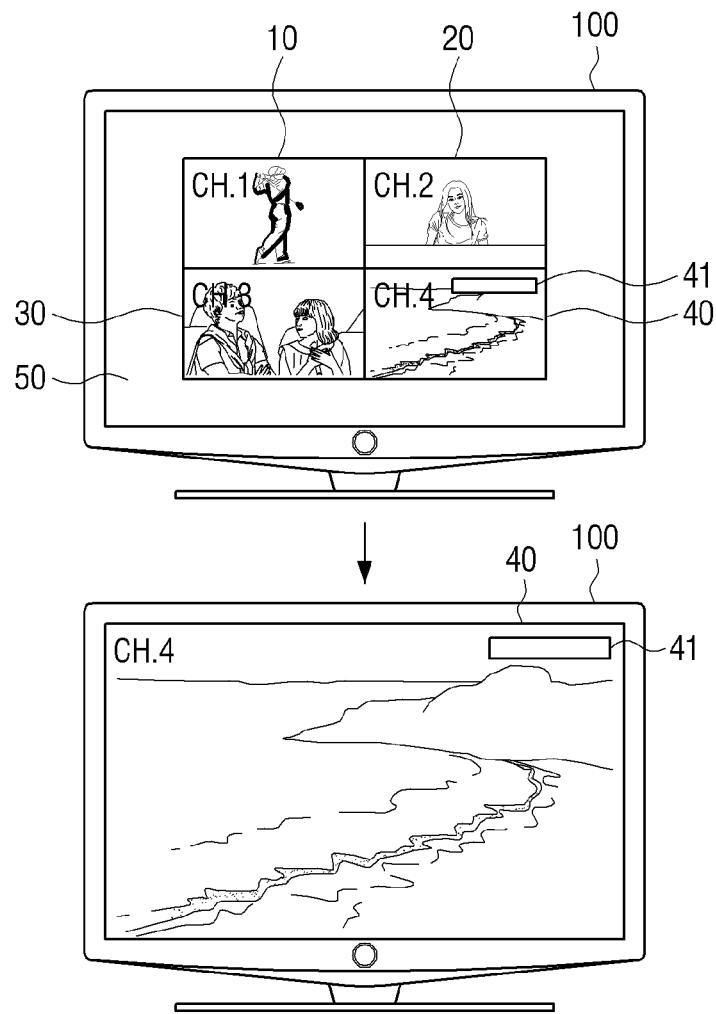
FIG. 9 is a view illustrating a screen of a display apparatus according to another exemplary embodiment of the present general inventive concept.
Figure 9:
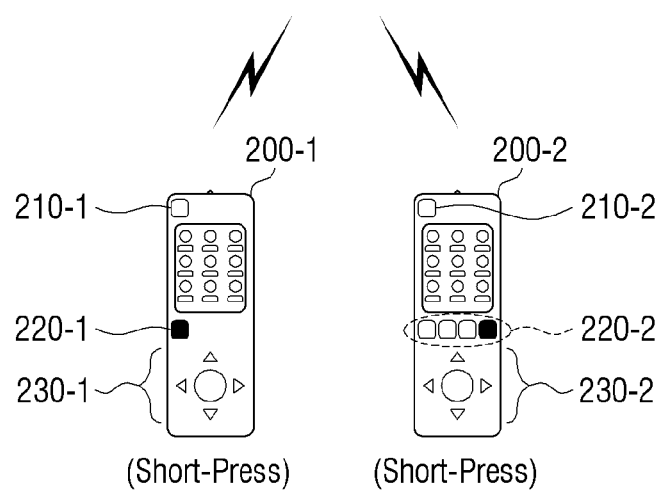

FIG. 9 is a view illustrating a screen of the display apparatus 100 according to another exemplary embodiment of the present general inventive concept.

As shown in FIG. 9, in a divided screen mode, a size of a full screen including a plurality of divided screens may be reduced and displayed to display the divided screen mode to a user. Therefore, in the divided screen mode, an edge area 50 that does not display a content may be formed. However, the edge area 50 may not be included in a single screen mode.

Figure 10A:
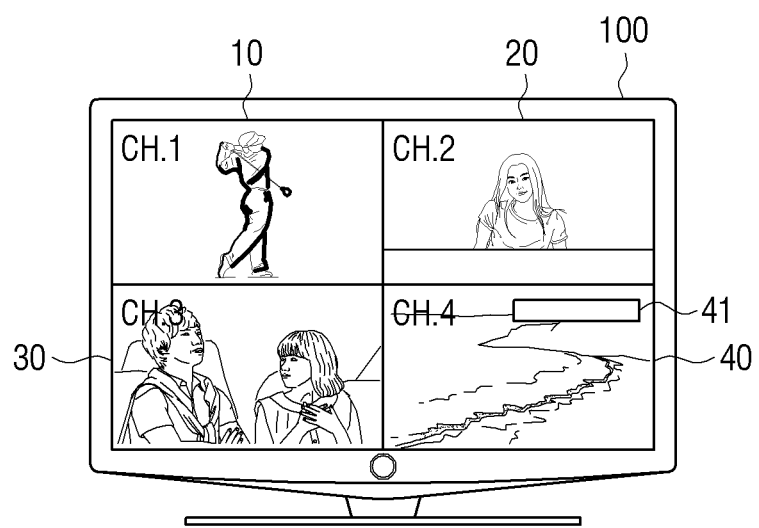
FIGS. 10A through 10C are views illustrating a screen of a display apparatus according to another exemplary embodiment of the present general inventive concept.
Figure 10B:
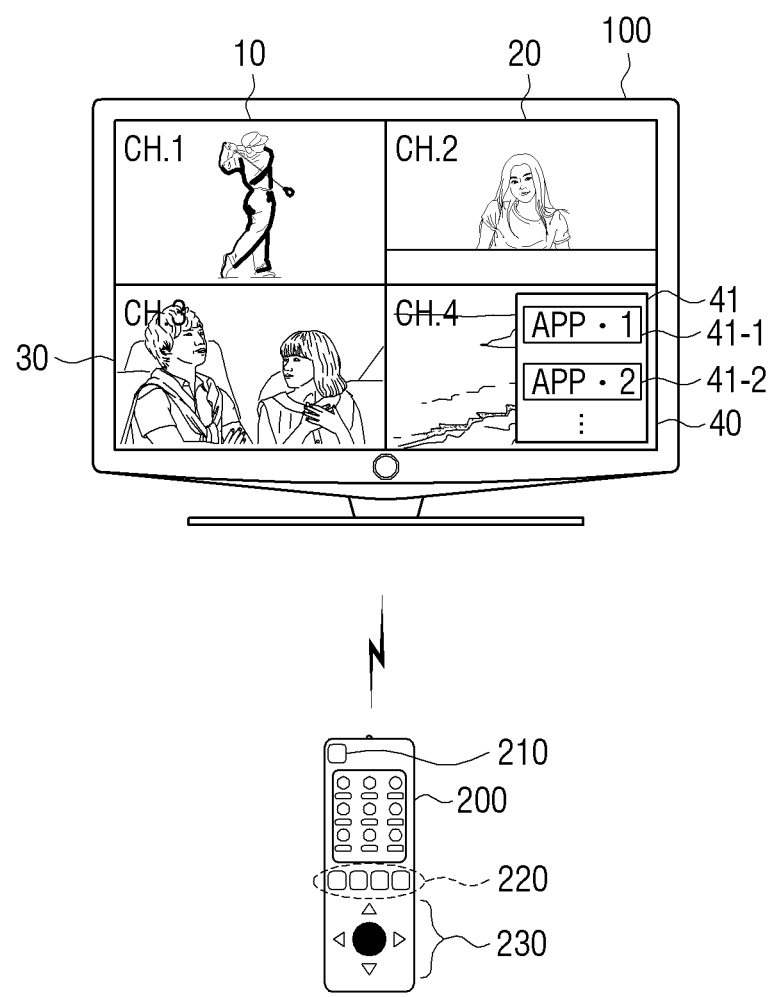
Figure 10C:
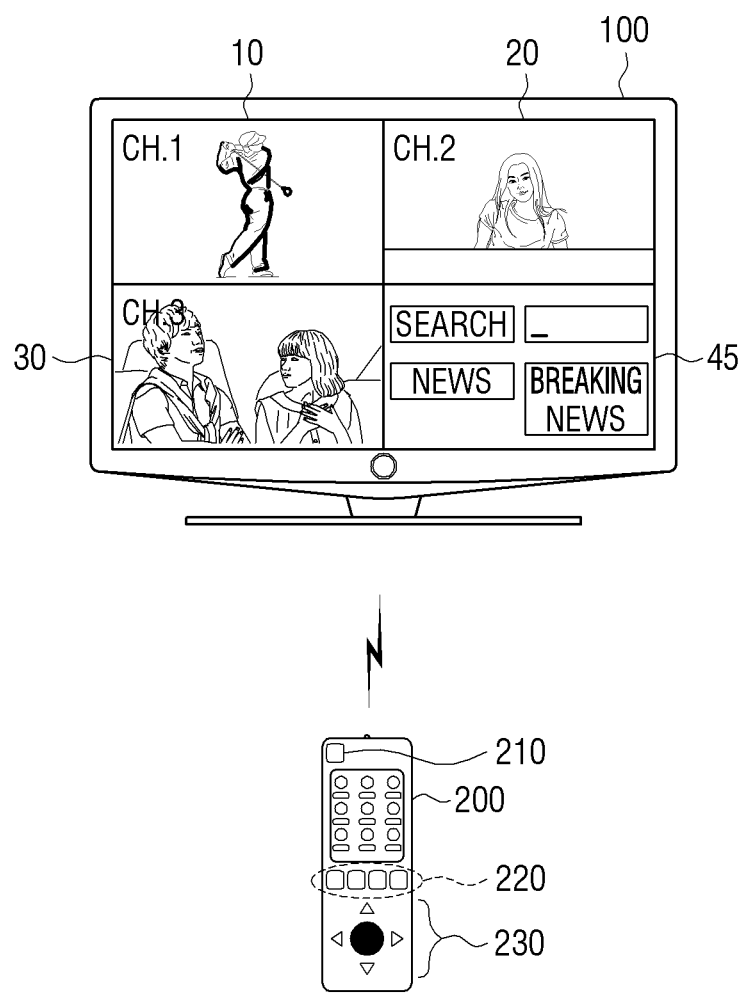

FIGS. 10A through 10C are views illustrating a screen of the display apparatus 100 according to another exemplary embodiment of the present general inventive concept.

Referring to FIG. 10A, a screen to be controlled is a fourth divided screen 40 in a divided screen mode in which first, second, third, and fourth divided screens 10, 20, 30, and 40 are displayed. Therefore, a fourth setting screen 41 is displayed on a side of the fourth divided screen 40.

If a selection button of direction buttons 230 is pressed, a list of applications that may be executed on the fourth divided screen 40 may be displayed on the fourth setting screen 41, and the list of applications may include at least one application.

In this case, a user may move to an application that the user wants to select, by using a left, right, upper, or lower button of the direction buttons 230. In this case, the corresponding application may show a vision effect to be distinguished from the other applications according to the direction buttons 230. Therefore, as shown in FIG. 10C, if the user presses a selection button of the direction buttons 230 when the user moves to one application, a selected application may be executed on a corresponding divided screen.

FIGS. 11A through 11F are views illustrating a screen of the display apparatus 100 according to another exemplary embodiment of the present general inventive concept.

Figure 11A:
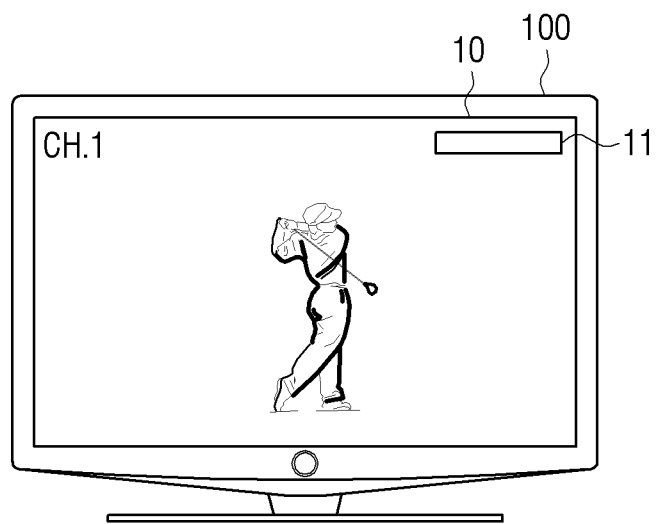
FIGS. 11A through 11F are views illustrating a screen of a display apparatus according to another exemplary embodiment of the present general inventive concept.
Figure 11B:
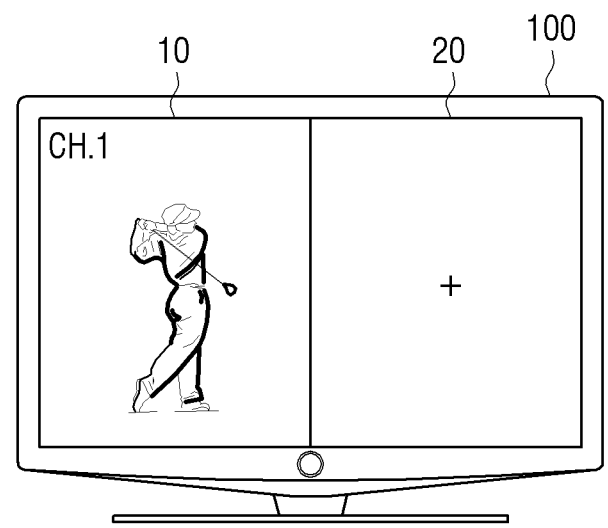
Figure 11B:
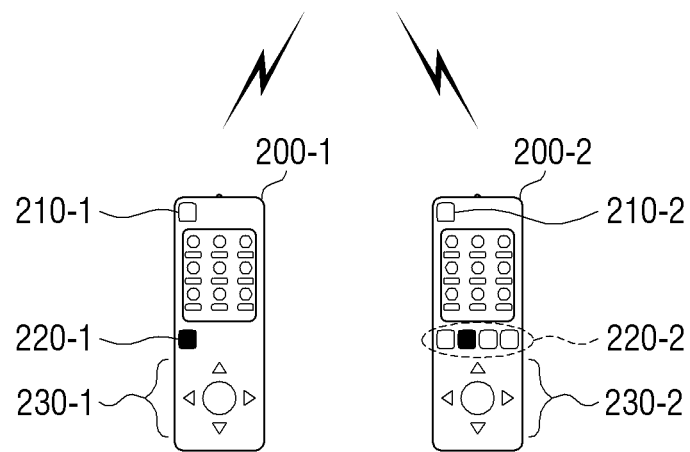
Figure 11C:
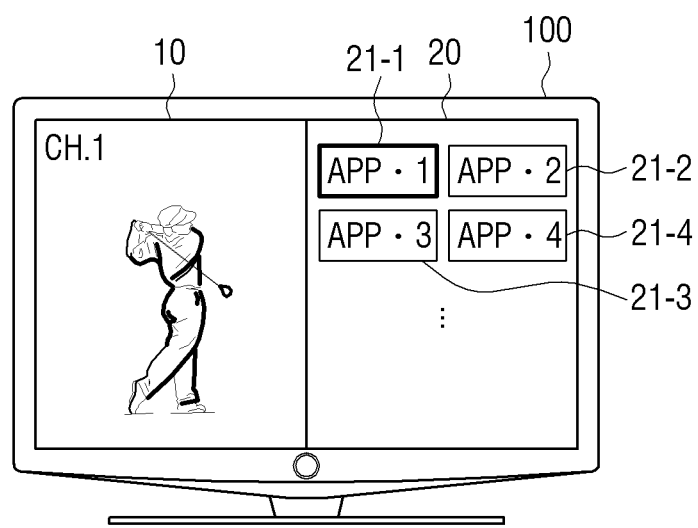
Figure 11C:
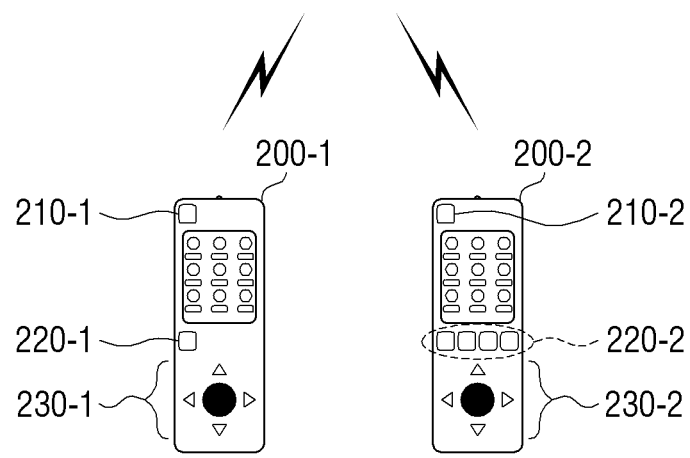
Figure 11D:
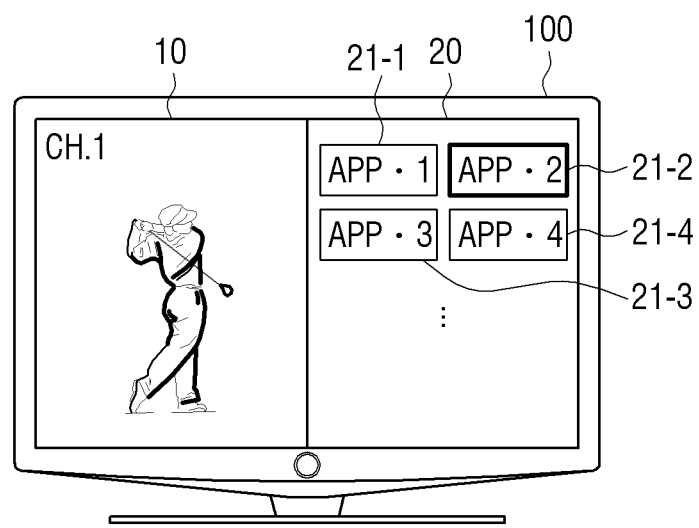
Figure 11D:
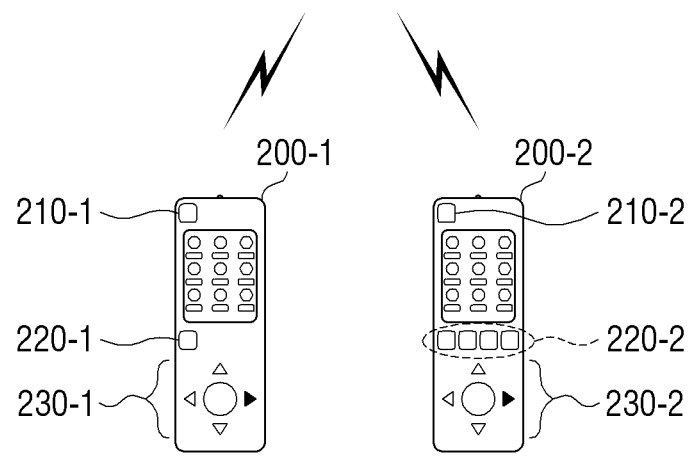
Figure 11E:
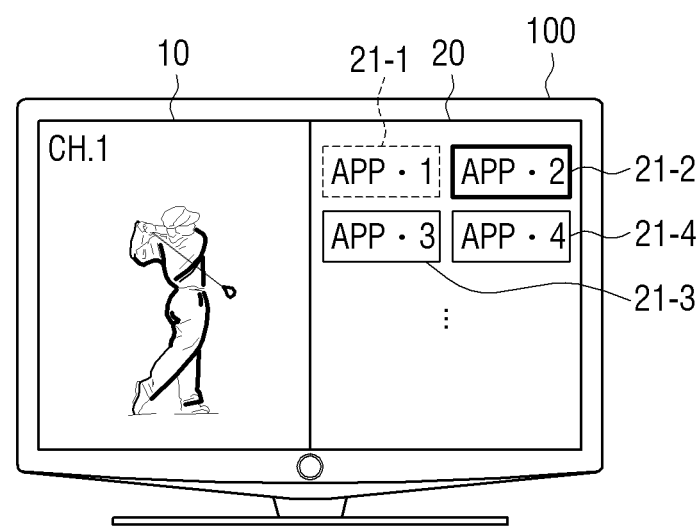
Figure 11E:
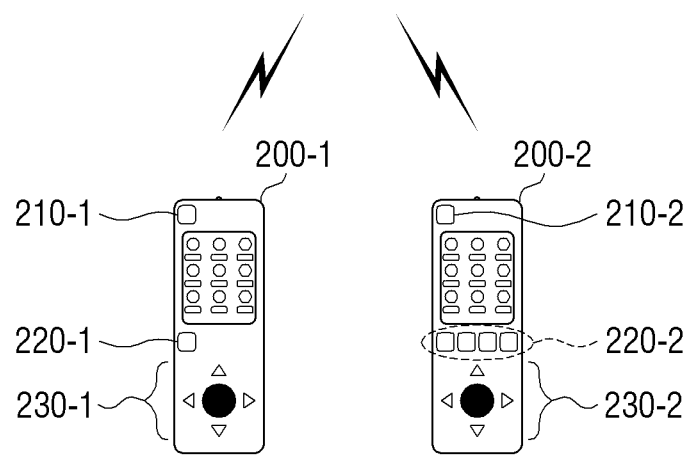
Figure 11F:
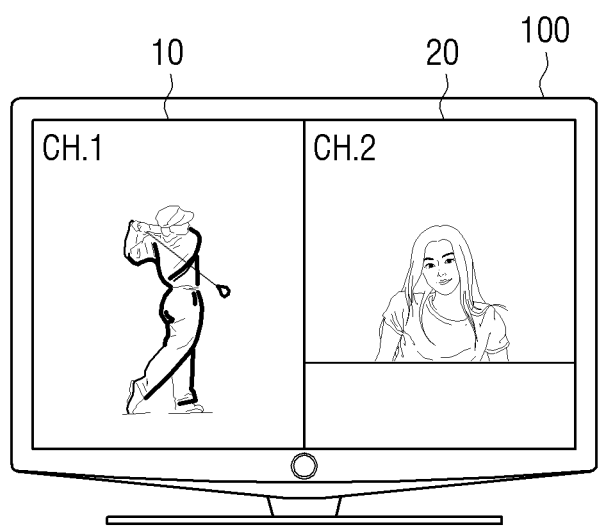

FIG. 11A illustrates a first divided screen 10 that is displayed as a single screen. If screen dividing buttons 220-1 and 220-2 are pressed long in this state, a second divided screen 20 is displayed, and a second setting screen 21 is displayed on a side of the second divided screen 20 as described above. However, as shown in FIG. 11B, if a content to be displayed does not match with the second divided screen 20, the content may not be displayed on the second divided screen 20, and a preset still image may be displayed. Therefore, the user may select the second setting screen 21 to match the content to be displayed with the second divided screen 20. As a result, as shown in FIG. 11C, at least one application may be displayed. In this case, the at least one application may be displayed in the second setting screen 21 or in the second divided screen 20. Since the user is to select a content that is to match with the second divided screen 20, the user may select a screen setting application by using the direction buttons 230-1 and 230-2 as shown FIG. 11D. If the user selects the screen setting application, the screen setting application is executed, and thus a content that may match with the second divided screen 20 may be displayed. As shown in FIG. 11E, CH.1 has matched with the first divided screen 10 and thus may be displayed so as to not be selected. The user may select a content, which is to be matched with the second divided screen 20, as CH.2 and select CH.2. Therefore, CH.2 may match with the second divided screen 20 and may be displayed.

Figure 12A:
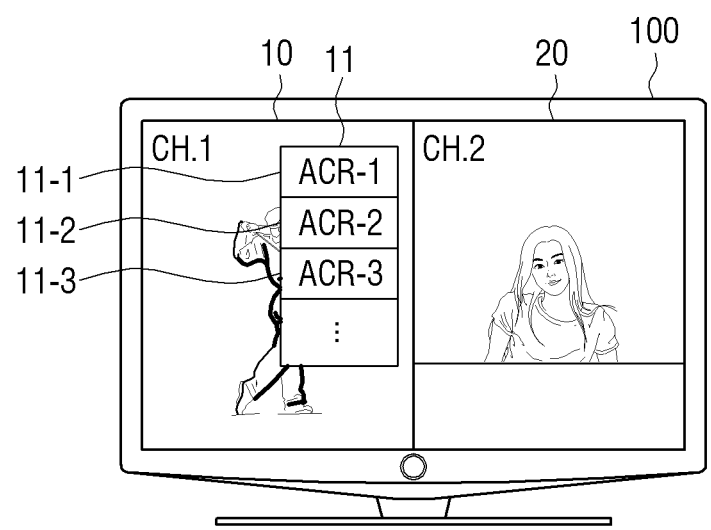
FIGS. 12A through 12C are views illustrating a screen of a display apparatus according to another exemplary embodiment of the present general inventive concept.
Figure 12B:
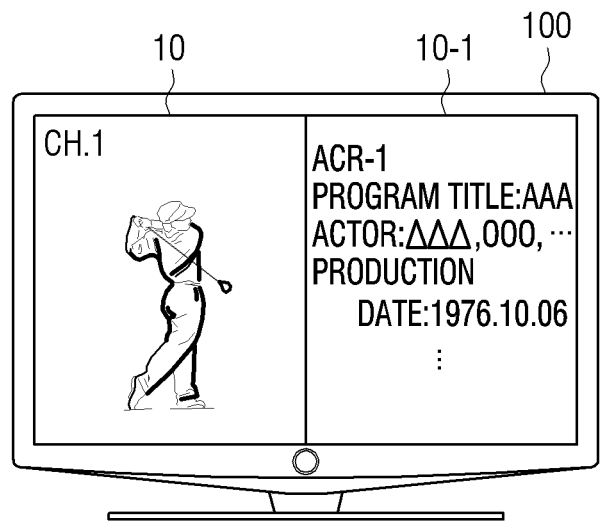
Figure 12C:
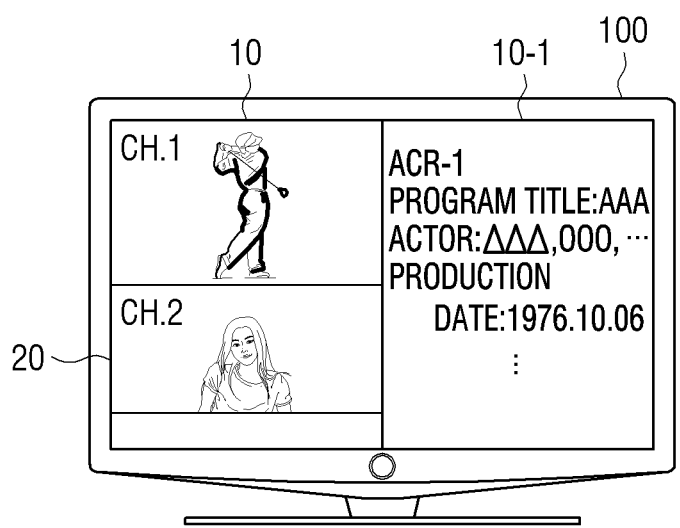

FIGS. 12A through 12C are views illustrating a screen of the display apparatus 100 according to another exemplary embodiment of the present general inventive concept.

As shown in FIG. 12A, in a divided screen mode, an automatic content recognition (ARC) list may displayed on a side of a first divided screen 10. Here, an ACR refers to an automatic content recognition technology where a multimedia search technology is applied to a content recognition. The ACR accurately and rapidly checks a content consumed by a user, such as a photo, a piece of music, a movie, a TV show, or the like, to provide the user with an experience in next generation social entertainment on a smart device, such as a smart phone, a tablet PC, a set-top box, a game machine, a smart TV, an IPTV, or the like, through a service or an application that has applied the content. The ACR provides information about a content played from an arbitrary device in a particular time slot, so that the user experiences a service or an application that is closely related to a content that the user is viewing. Therefore, the user may experience interactive multimedia content. When contents that respectively match with first and second divided screens 10 and 20 are respectively displayed, the ACR list is displayed on the first divided screen 10. The user may select one ACR by using the direction buttons 230-1 and 230-2. If the ACR is selected, a content that matches with the second divided screen 20 and is displayed may disappear from the second divided screen 20, and the selected ACR may be displayed on the second divided screen 20 as shown in FIG. 12B. If an ACR is selected in a single screen mode, the second divided screen 20 may be formed, and the ACR may be displayed on the formed second divided screen 20.

As shown in FIG. 12C, although one ACR is selected from the ACR list displayed on the first divided screen 10, a content displayed on the second divided screen 20 may be displayed regardless of a display of the selected ACR. In this case, a content matching with the second divided screen 20 may be displayed on the second divided screen 20 or in a newly divided screen.

Figure 13:
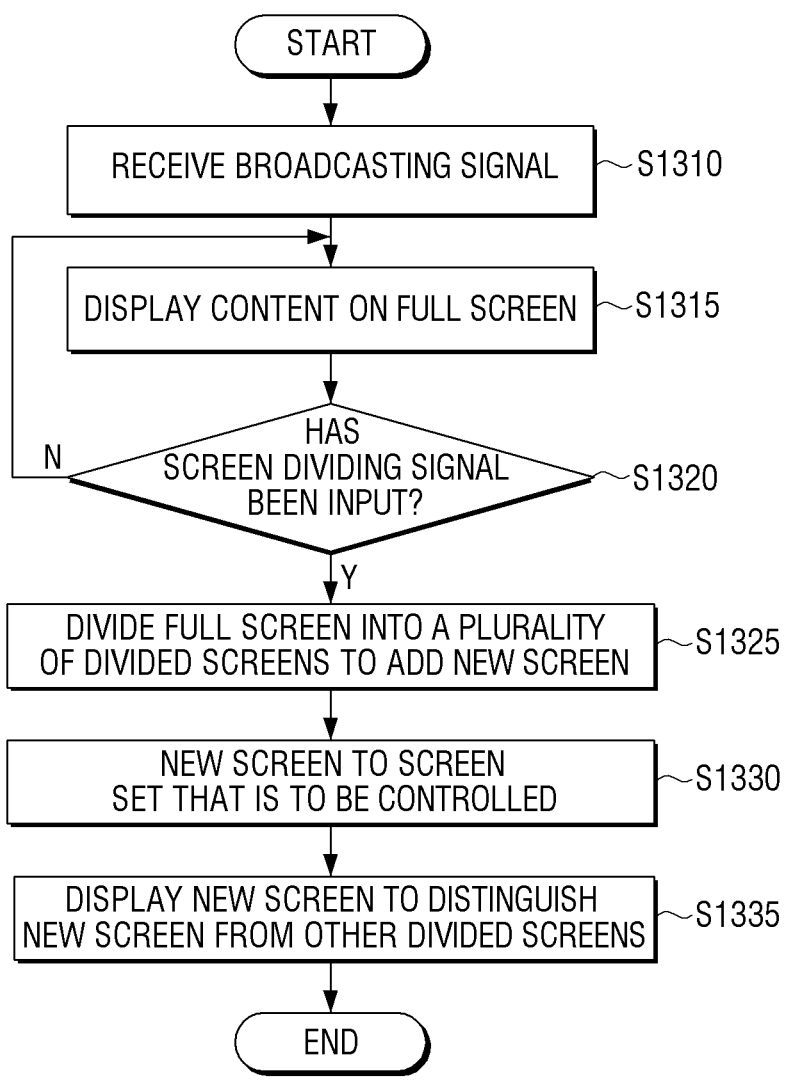
FIG. 13 is a flowchart illustrating a display method according to an exemplary embodiment of the present general inventive concept.

FIG. 13 is a flowchart illustrating a display method according to an exemplary embodiment of the present general inventive concept. Repeated descriptions of the preset exemplary embodiment as those of the previous exemplary embodiments are omitted herein.

Referring to FIG. 13, the display method according to the present exemplary embodiment includes: receiving a broadcasting signal; displaying a content on a full screen; determining whether a screen dividing signal has been input through a remote controller; dividing the full screen into a plurality of divided screens to add a new screen; setting the new screen to a screen that is to be controlled; and displaying the screen to be controlled so that the screen is distinguished from the other divided screens.

In operation S1310, a display apparatus receives a broadcasting signal from an external transmitter. In this case, the broadcasting signal may include a content and/or information about the content. If the display apparatus receives the broadcasting signal, the display apparatus displays a content included in the received broadcasting signal on a full screen in operation S1315. In operation S1320, the display apparatus determines whether a screen dividing signal has been input. In this case, the display apparatus may determine whether the screen dividing signal has been input through a remote controller.

If it is determined in operation S1320 that the screen dividing signal has not been input through the remote controller, the display apparatus may keep displaying the content included in the received broadcasting signal on the full screen. If it is determined in operation S1320 that the screen dividing signal has been input through the remote controller, the display apparatus divides the full screen into a plurality of divided screens to add a new screen in operation S1325.

In operation S1330, the display apparatus sets the new screen of the plurality of divided screens to a screen that is to be controlled according to a control signal. In operation S1335, the display apparatus displays the new screen to distinguish the new screen from the other divided screens.

The display method may further included: if a direction signal is input from the remote controller, changing the screen to be controlled among the plurality of divided screens according to the direction signal; and if it is determined a full screen signal has been input from the remote controller, displaying the screen to be controlled, as the full screen.

The display method may further include: if a button of the remote controller is pressed long for a preset threshold time, determining that the screen dividing signal has been input; and if the button of the remote controller is pressed short for less than the preset threshold time, determining that the full screen signal has been input.

The display method may further include: if one of a plurality of buttons of the remote controller is pressed long for a preset threshold time, determining that the screen dividing signal has been input; dividing the full screen into a plurality of divided screens to add a new screen; and displaying a content, which is provided from a source matching with the long-pressed button, on the new screen.

The display method may further include: if the long-pressed button of the plurality of buttons is pressed long once, displaying a content, which is provided from a source matching with the long-pressed button, on the full screen.

The display method may further include: displaying at least one selectable application information on the new screen; selecting one from the at least one selectable application information; and displaying an execution screen of an application corresponding to the selected one application information on the new screen.

The display method may further include: sequentially and differently adjusting the number of divided screens according to the number of inputs of the screen dividing signal.

The display method may further include: if the full screen is divided into the plurality of divided screens, reducing and displaying the full screen including the plurality of divided screens in a smaller size than a full display area of a display unit.

The display method may further include: displaying a UI, which may select a new content to be displayed on the new screen, on the new screen.

The display method may further include: displaying contents that respectively match with the plurality of divided screens.

The display method may further include: displaying an ACR list within at least one of a plurality of divided screens; and if one ACR is selected from the ACR list, displaying the selected ACR in the corresponding divided screen.

According to various exemplary embodiments of the present general inventive concept as described above, a remote controller may be simply controlled so as to use various types of screens.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a receiver configured to receive a broadcasting signal;
a display unit configured to display a content comprised in the received broadcasting signal on a full screen;
a control signal receiver configured to receive a control signal from a remote controller; and
a controller configured to, when a first control signal corresponding to a first button of the remote controller is received from the remote controller, divide the full screen into a plurality of divided screens to add a new screen, set one of the plurality of divided screens as a target screen to be controlled according to the first control signal and display the target screen so as to be distinguishable from other divided screens,
wherein the controller, when a second control signal corresponding to a second button of the remote controller is received from the remote controller in the divided state of the screen, controls the target screen based on the second control signal other than the other divided screens.

2. The display apparatus of claim 1, wherein if a direction signal is input from the remote controller, the controller changes the new screen to be controlled among the plurality of divided screens according to the direction signal, and if it is determined that a full screen signal has been input from the remote controller, the controller controls the display unit to display the new screen to be controlled on the full screen.

3. The display apparatus of claim 2, wherein if a button of the remote controller is pressed long for a threshold duration, the controller determines that the screen dividing signal has been input, and if the button of the remote controller is pressed short for less than the threshold duration, the controller determines that the full screen signal has been input.

4. The display apparatus of claim 2, wherein if one of a plurality of buttons of the remote controller is pressed long for a threshold duration, the controller determines that the screen dividing signal has been input, divides the full screen into the plurality of divided screens to add the new screen, and displays a content, which is provided from a source corresponding to the long-pressed button, on the new screen.

5. The display apparatus of claim 4, wherein if the long-pressed button of the plurality of buttons is pressed short, the controller displays a content, which is provided from a source matching with the button, on the full screen.

6. The display apparatus of claim 1, wherein the controller displays at least one selectable application information on the new screen, and if one application information is selected from the at least one selectable application information, displays an execution screen of an application corresponding to the selected one application information, on the new screen.

7. The display apparatus of claim 5, wherein the controller sequentially adjusts a number of the plurality of divided screens according to a number of inputs of the screen dividing signal.

8. The display apparatus of claims 1, wherein if the full screen is divided into the plurality of divided screens, the controller reduces and displays the full screen comprising the plurality of divided screens in a smaller size than a full display area of the display unit.

9. The display apparatus of claim 1, wherein the controller displays a user interface (UI), which enables selection of a new content to be displayed on the new screen.

10. The display apparatus of claim 1, wherein the controller displays contents that respectively correspond to the plurality of divided screens.

11. The display apparatus of claim 1, wherein the controller displays an automatic content recognition (ACR) list within at least one of the plurality of divided screens, and if one ACR is selected from the ACR list, displays the selected ACR on the corresponding divided screen.

12. A display method of a display apparatus, the display method comprising:
receiving a broadcasting signal;
displaying a content comprised in the received broadcasting signal on a full screen;
when a first control signal corresponding to a first button of the remote controller is received from the remote controller, dividing the full screen into a plurality of divided screens to add a new screen;
setting one of the plurality of divided screens as a target screen to be controlled according to the first control signal;
displaying the target screen so as to be distinguishable from other divided screens; and
when a second control signal corresponding to a second button of the remote controller is received from the remote controller in the divided state of the screen, controlling the target screen based on the second control signal other than the other divided screens.

13. The display method of claim 12, further comprising:
if a direction signal is input from the remote controller, changing the new screen to be controlled among the plurality of divided screens according to the direction signal; and
if it is determined that a full screen signal has been input from the remote controller, displaying the new screen to be controlled on the full screen.

14. The display method of claim 13, further comprising:
if a button of the remote controller is pressed long for a threshold duration, determining that the screen dividing signal has been input; and
if the button of the remote controller is pressed short for less than the threshold duration, determining that the full screen signal has been input.

15. The display method of claim 13, further comprising:
if one of a plurality of buttons of the remote controller is pressed long for a threshold duration, determining that the screen dividing signal has been input;

dividing the full screen into the plurality of divided screens to add the new screen; and
displaying a content, which is provided from a source matching with the long-pressed button, on the new screen.

16. The display method of claim 15, further comprising:
if the long-pressed button of the plurality of buttons is pressed short, displaying a content, which is provided from a source corresponding to the long-pressed button, on the full screen.

17. The display method of claim 12, further comprising:
displaying at least one selectable application information on the new screen;
selecting one application information from the at least one selectable application information; and
displaying an execution screen of an application corresponding to the selected one application information on the new screen.

18. The display method of claim 16, further comprising:
sequentially adjusting a number of the plurality of divided screens according to a number of inputs of the screen dividing signal.

19. The display method of claim 12, further comprising:
if the full screen is divided into the plurality of divided screens, reducing and displaying the full screen comprising the plurality of divided screens in a smaller size than a full display area of a display unit.

20. The display method of claim 12, further comprising:
displaying a user interface (UI) which enables selection of a new content to be displayed on the new screen.

21. The display method of claims 12, further comprising:
displaying contents that respectively correspond to the plurality of divided screens.

22. The display method of claim 12, further comprising:
displaying an automatic content recognition (ACR) list within at least one of the plurality of divided screens; and
if one ACR is selected from the ACR list, displaying the selected ACR on a corresponding divided screen.

23. The display apparatus of claim 1, wherein the new screen is pre-set by a user.

24. The display apparatus of claim 1, wherein the controller, when the first control signal corresponding to the first button of the remote controller is received from the remote controller in a divided state of a screen, displays the target screen in the full screen.

* * * * *